United States Patent
Oda et al.

(10) Patent No.: US 7,385,157 B2
(45) Date of Patent: Jun. 10, 2008

(54) LASER BEAM WELDING METHOD AND APPARATUS

(75) Inventors: Koji Oda, Tochigi-ken (JP); Naoki Fukai, Higashimatsuyama (JP); Jun Kitagawa, Utsunomiya (JP); Junya Tanabe, Tochigi-ken (JP); Keiji Otsuka, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/475,320

(22) PCT Filed: Apr. 24, 2002

(86) PCT No.: PCT/JP02/04076

§ 371 (c)(1),
(2), (4) Date: Oct. 21, 2003

(87) PCT Pub. No.: WO02/087816

PCT Pub. Date: Nov. 7, 2002

(65) Prior Publication Data

US 2004/0118818 A1    Jun. 24, 2004

(30) Foreign Application Priority Data

| Apr. 27, 2001 | (JP) | ............................ 2001-132843 |
| Apr. 27, 2001 | (JP) | ............................ 2001-132849 |
| Apr. 27, 2001 | (JP) | ............................ 2001-132854 |

(51) Int. Cl.
*B23K 26/08* (2006.01)
*B23K 26/42* (2006.01)

(52) U.S. Cl. ........................... 219/121.63; 219/121.64; 219/121.82

(58) Field of Classification Search ........... 219/121.63, 219/121.64, 121.82
See application file for complete search history.

(56) References Cited

U.S. PATENT DOCUMENTS

| 3,926,420 A | * | 12/1975 | Raymond ..................... 269/47 |
| 4,623,229 A | * | 11/1986 | Galan ......................... 359/845 |
| 4,745,257 A | * | 5/1988 | Rito et al. ............. 219/121.64 |

(Continued)

FOREIGN PATENT DOCUMENTS

EP    0 365 229 A1    10/1989

(Continued)

OTHER PUBLICATIONS

Patent Abstracts of Japan: vol. 009, No. 279 (Nov. 7, 1985).

(Continued)

*Primary Examiner*—Samuel M. Heinrich
(74) *Attorney, Agent, or Firm*—Birch, Stewart, Kolasch & Birch, LLP

(57) ABSTRACT

While steel sheets are positioned and held by a holding mechanism, a first laser beam is applied to a heating region of the steel sheet to space the steel sheet from the other steel sheet by a predetermined distance. A second laser beam is applied to a welding region to weld the steel sheets. An amount of heat applied by the first laser beam, a moving speed of the first laser beam, and a focused spot diameter of the first laser beam are set to keep the sheet irradiated with the first laser beam in an unmelted state and plastically deform the sheet.

23 Claims, 17 Drawing Sheets

U.S. PATENT DOCUMENTS

| | | | |
|---|---|---|---|
| 4,835,357 A | 5/1989 | Schalk | |
| 4,859,826 A * | 8/1989 | Hess, III | 219/121.63 |
| 4,904,842 A * | 2/1990 | Yasuda et al. | 219/137 R |
| 5,104,032 A * | 4/1992 | Spies et al. | 228/173.6 |
| 5,216,220 A * | 6/1993 | Davis et al. | 219/121.63 |
| 5,229,571 A * | 7/1993 | Neiheisel | 219/121.63 |
| 5,478,983 A | 12/1995 | Rancourt | |
| 5,942,138 A | 8/1999 | Toda et al. | |
| 6,060,681 A * | 5/2000 | Bachhofer et al. | 219/121.63 |
| 6,211,483 B1 * | 4/2001 | Bishop | 219/121.63 |
| 6,528,756 B2 * | 3/2003 | Degawa et al. | 219/121.64 |
| 6,545,246 B2 * | 4/2003 | Kummle | 219/121.63 |
| 6,633,018 B2 * | 10/2003 | Shikoda et al. | 219/121.63 |
| 6,797,915 B2 * | 9/2004 | Jack | 219/121.64 |
| 6,856,634 B2 * | 2/2005 | Mikame | 372/38.02 |
| 6,914,213 B2 * | 7/2005 | Alips et al. | 219/121.64 |
| 2001/0047983 A1 * | 12/2001 | Degawa et al. | 219/121.64 |
| 2002/0038792 A1 * | 4/2002 | Terada et al. | 219/121.6 |
| 2002/0144984 A1 * | 10/2002 | Mori et al. | 219/121.64 |
| 2004/0050829 A1 * | 3/2004 | Jack | 219/121.63 |

FOREIGN PATENT DOCUMENTS

| | | | |
|---|---|---|---|
| EP | 0 687 519 A | | 12/1995 |
| EP | 1005944 A2 | * | 7/2000 |
| FR | 2 600 923 A | | 1/1988 |
| FR | 2 790 689 A | | 9/2000 |
| FR | 2 798 084 A | | 3/2001 |
| JP | 54102257 A | * | 8/1979 |
| JP | 60-121093 A | | 6/1985 |
| JP | 04-258391 A | | 9/1992 |
| JP | 05-057465 A | | 3/1993 |
| JP | 05-092220 A | | 4/1993 |
| JP | 07-032180 A | | 2/1995 |
| JP | 07-080669 A | | 3/1995 |
| JP | 08-090264 A | | 4/1996 |
| JP | 2743708 B2 | | 2/1998 |

OTHER PUBLICATIONS

Patent Abstracts of Japan: vol. 1995, No. 05, (Jun. 30, 1995).
Patent Abstracts of Japan: vol. 1997, No. 12, (Dec. 25, 1997).
Patent Abstracts of Japan: vol. 1995, No. 04 (May 31, 1995).

* cited by examiner

PRIOR ART

PRIOR ART

LASER BEAM WELDING METHOD AND APPARATUS

This application is the national phase under 35 U.S.C. § 371 of PCT International Application No. PCT/JP02/04076 which has an International filing date of Apr. 24, 2002, which designated the United States of America.

TECHNICAL FIELD

The present invention relates to a method of and an apparatus for welding overlapping regions of a plurality of plates, each having a base metal covered with a layer of a metal whose melting point is lower than the melting point of the base metal, to each other by applying laser beams to the overlapping regions.

BACKGROUND ART

Japanese Patent Publication No. 3115456 (hereinafter referred to as "prior art 1") discloses a known laser beam welding process of welding two plates, each having a base metal covered with a layer of a metal whose melting point is lower than the melting point of the base metal, overlapping each other.

According to the disclosed laser beam welding process, two steel sheets plated with zinc, i.e., two galvanized steel sheets, each having a steel sheet as a base metal covered with a layer of zinc whose melting point is lower than the melting point of the base metal, overlap each other, and supported with their ends unconstrained. Only one of the galvanized steel sheets to which the laser beam is applied is melted in advance by the laser beam at a position which is displaced 1 mm through 15 mm from the center of the welded region of the overlapping steel sheets toward the constrained region thereof. The end of the galvanized steel sheet which is irradiated with the laser beam is deformed, creating a gap between the galvanized steel sheets. Thereafter, the superposed galvanized steel sheets are welded to each other.

According to the prior art 1, in order to deform the end of the galvanized steel sheet, the laser beam is applied to melt the galvanized steel sheet, and the galvanized steel sheet is spaced from the other galvanized steel sheet upon solidification and shrinkage of the melted surface. Depending on how the galvanized steel sheet is melted, the amount of deformation of the end of the galvanized steel sheet varies. For example, the amount of deformation of the end of the galvanized steel sheet may be reduced even if the amount by which the galvanized steel sheet is melted increases.

Specifically, as shown in FIG. 15 of the accompanying drawings, a laser beam L was applied to a galvanized steel sheet 1 having a thickness t, and the depth D of a melted pool 2 produced in the galvanized steel sheet 1 by the laser beam L and the amount K by which the galvanized steel sheet 1 is deformed at a position spaced 10 mm from the position where the laser beam L is applied were detected for different samples. The thickness t was 0.7 mm and 2.0 mm, and the laser beam L was moved at speeds (machining speeds) of 5 m/min. and 2 m/min. At various laser output settings (w), the following results were obtained:

TABLE 1

| Thickness (mm) | Machining speed (m/min) | Output (w) | D (mm) | H (mm) |
|---|---|---|---|---|
| 0.7 | 5 | 300 | 0.106 | 0.130 |
| 0.7 | 5 | 600 | 0.199 | 0.220 |
| 0.7 | 5 | 900 | 0.235 | 0.270 |
| 0.7 | 5 | 1200 | 0.332 | 0.274 |
| 0.7 | 5 | 1500 | 0.444 | 0.097 |
| 2.0 | 2 | 800 | 0.324 | 0.059 |
| 2.0 | 2 | 1000 | 0.642 | 0.194 |
| 2.0 | 2 | 1200 | 0.976 | 0.970 |
| 2.0 | 2 | 1500 | 1.597 | 0.112 |

It can be seen from Table 1 that the galvanized steel sheet 1 cannot be deformed as desired simply by increasing the laser output setting to increase the amount by which the galvanized steel sheet is melted. Therefore, a zinc gas vaporized when two galvanized steel sheets 1 are welded is not well discharged out, resulting in a welding failure due to blowhole, etc.

According to the conventional laser beam welding process disclosed in the prior art 1, it is necessary to apply a first laser beam to deform the end of one of the galvanized steel sheets and also to apply a second laser beam to weld the overlapping regions of the galvanized steel sheets, independently of each other. Therefore, the entire laser beam welding process is considerably complex and has low productivity.

For joining the ends of three or more overlapping sheets with a laser beam, it is customary to apply the laser beam in the direction in which the sheets overlap each other for welding the ends of the overlapping sheets. If the overlapping sheets to be welded are thick, then a large amount of heat needs to be applied to melt the sheets, resulting in a large thermal strain which makes it impossible to perform a desired laser beam welding process.

Other welding processes for welding overlapping sheets are disclosed in Japanese Laid-Open Patent Publication No. 7-16775 (hereinafter referred to as "prior art 2") and Japanese Laid-Open Patent Publication No. 9-206969 (hereinafter referred to as "prior art 3").

According to the prior art 2, as shown in FIG. 16 of the accompanying drawings, of three overlapping flanges 1a, 2a, 3a are to be welded, the flange 1a at one end in the overlapping direction, i.e., the direction in which the flanges 1a, 2a, 3a overlap each other, and the flange 2a adjacent to the flange 1a are irradiated with a high-density laser beam which is applied in the overlapping direction. The flanges 1a, 2a are welded together by the applied high-density laser beam, with a bead 4a formed across the flanges 1a, 2a in the overlapping direction.

Then, the flanges 2a, 3a are welded to each other by a laser beam which is applied to the edges thereof in a direction perpendicular to the overlapping direction parallel to the interfaces of the flanges 2a, 3a. A bead 5a is formed in the flanges 2a, 3a along the interfaces thereof in the direction perpendicular to the overlapping direction.

According to the prior art 3, as shown in FIG. 17 of the accompanying drawings, three sheets including an outer panel 6a, an inner panel 6b, and a reinforcement 6c have overlapping ends to be welded into a joint 8a by a laser beam welding machine 7a. The laser beam welding machine 7a applies a laser beam to the edge of the joint 8a while moving in a zigzag pattern over the edge of the joint 8a, thus heating the edge of the joint 8a and forming a zigzag welded seam 9a.

With the prior art 2, when the three flanges 1a, 2a, 3a are to be welded together, the first laser beam is applied in the overlapping direction to weld the flanges 1a, 2a to each other, and the second laser beam is applied in the direction perpendicular to the overlapping direction to weld the flanges 2a, 3a to each other. The welding process according to the prior art 2 involves a number of welding steps and is low in productivity the three sheets need to be irradiated with the two laser beams applied in the different directions.

With the prior art 3, the welding system is complex in structure and control as the laser beam welding machine 7a has to be moved in the zigzag pattern, and may possibly fail to weld the interfaces of overlapping sheets having different thicknesses and materials.

DISCLOSURE OF INVENTION

It is a general object of the present invention to provide a method of and an apparatus for performing a high-quality laser beam welding process simply and quickly for increased productivity.

A main object of the present invention is to provide a method of and an apparatus for welding the overlapping edges of three or more sheets quickly and reliably with a simple process and arrangement.

According to the present invention, a welding region of sheets to be welded is positioned and held by a holding mechanism, and a first laser beam is applied to one of the sheets near the holding mechanism to heat and space the sheet from the other sheet by a predetermined distance. A second laser beam is applied to a region of the sheets spaced from the first laser beam thereby to weld the sheets to each other.

An amount of heat applied by the first laser beam, a moving speed of the first laser beam, and a focused spot diameter of the first laser beam are set to keep the sheet irradiated with said first laser beam in an unmelted state. The amount by which the sheet is deformed is prevented from varying unlike the conventional process in which the sheet tends to be deformed differently when melted. The sheets to be welded can well be welded while being spaced a desired distance from each other.

A metal gas, e.g., a zinc gas, vaporized when the sheets are welded is well discharged through the gap between the sheets. Therefore, the sheets can be welded accurately and efficiently by the laser beams for increased productivity without causing a welding failure.

According to the present invention, a welding region of sheets to be welded is positioned and held by a holding mechanism, and a first laser beam is applied to one of the sheets near the holding mechanism and, at the same time, is moved in a welding direction to heat and space the sheet from the other sheet by a predetermined distance. A second laser beam is applied to a region of the sheets spaced from the first laser beam, and is moved in the welding direction in synchronism with the first laser beam, thereby to weld the sheets to each other.

Since the first and second laser beams are moved in the welding direction in synchronism with each other, the sheets are welded to each other in one stroke of movement of the laser beams. The laser beam welding process is thus performed simply and quickly for effectively increased productivity, unlike the conventional laser beam welding process in which laser beams are individually applied twice.

According to the present invention, furthermore, while sheets to be welded are being positioned and held by a holding mechanism, as many laser beams as the number of two or more interfaces provided by contacting surfaces of the sheets are substantially simultaneously applied to the interfaces. Therefore, the two or more interfaces between the sheets which contribute to a desired strength can simultaneously be melted by applying the laser beams once. The sheets can thus be welded efficiently and quickly with a simple process and arrangement, and thermal strains are prevented from being developed in the sheets.

The above and other objects, features, and advantages of the present invention will become more apparent from the following description when taken in conjunction with the accompanying drawings in which preferred embodiments of the present invention are shown by way of illustrative example.

BEST MODE FOR CARRYING OUT THE INVENTION

Figure 1:
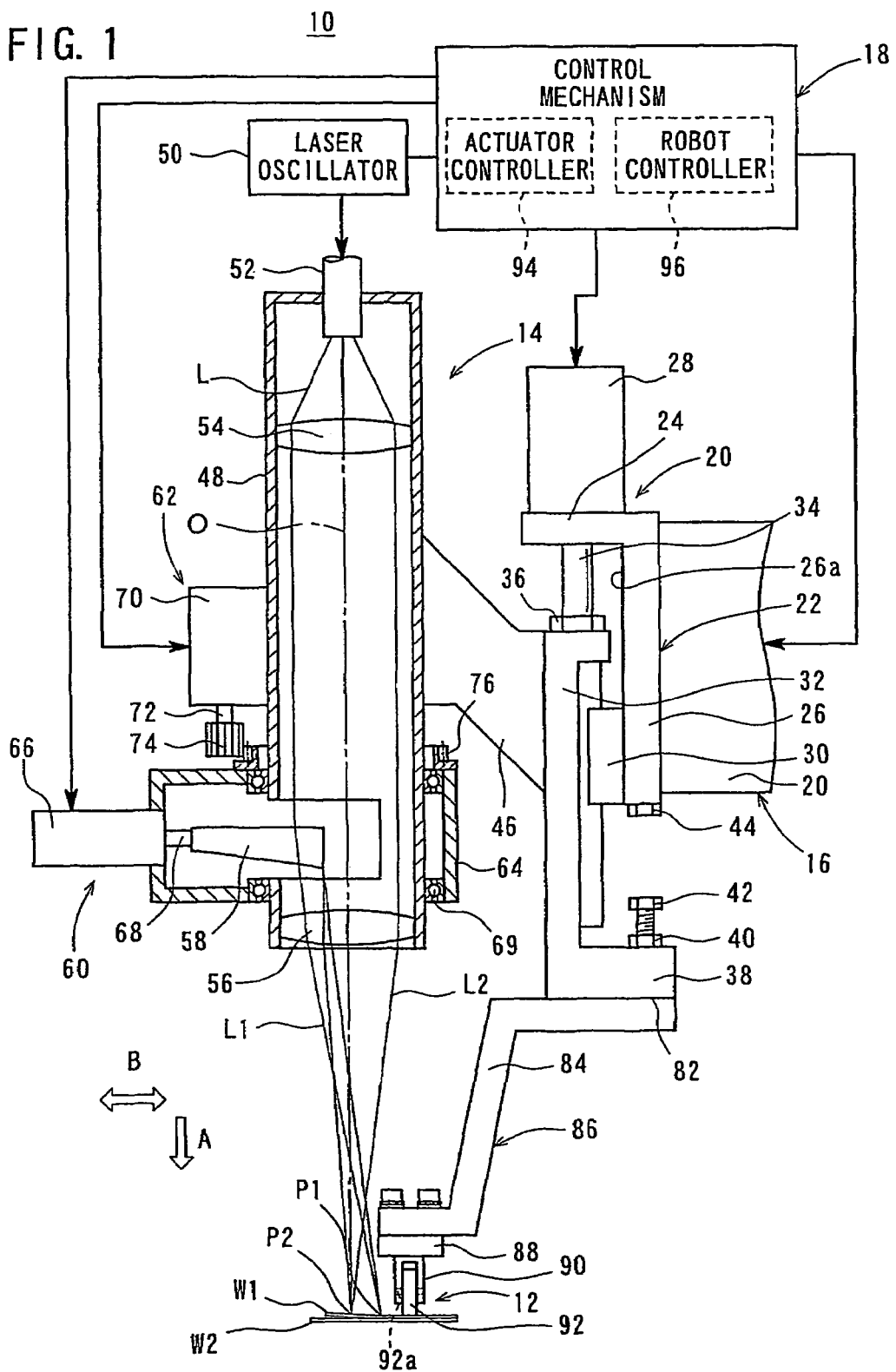
FIG. 1 is a side elevational view, partly in cross section and in block form, of a laser beam welding apparatus which carries out a laser beam welding method according to a first embodiment of the present invention.

FIG. 1 shows in side elevation, partly in cross section and in block form, a laser beam welding apparatus 10 which carries out a laser beam welding method of a first embodiment according to the present invention.

The laser beam welding apparatus 10 is not limited to a particular use, and but may be used to weld galvanized steel sheets W1, W2 such as automobile roof sheets.

The laser beam welding apparatus 10 comprises a holding mechanism 12 for positioning and holding a welding region of the steel sheets W1, W2, a laser beam applying mechanism 14 for applying a first laser beam L1 to a heating region P1 of the steel sheet W1 in the vicinity of the holding mechanism 12 to heat the heating region P1 and also applying a second laser beam L2 to a welding region P2, which is spaced a given distance from the first laser beam L1, to weld the steel sheets W1, W2 to each other, a robot arm (moving mechanism) 16 for moving the first and second laser beams L1, L2 in synchronism with each other in a welding direction, and a control mechanism 18 for controlling the amounts of heat applied by the first and second laser beams L1, L2.

A support bracket 22 of a workpiece position correcting mechanism 20 is fixed to the robot arm 16. The mechanism 20 operates for correcting a position of a workpiece and for returning the robot arm 16 in a home position. The support bracket 22 has an upper horizontal panel 24 and a side vertical panel 26 extending downwardly from the upper horizontal panel 24 substantially perpendicularly thereto. A first actuator 28 such as an air cylinder or the like is mounted on an upper surface of the upper horizontal panel 24. A guide member 30 which slidably supports a moving member 32 is attached to an inner side surface 26a of the side vertical panel 26.

One side of the moving member 32 is slidably supported by the guide member 30. The moving member 32 has an upper end fastened to a rod 34 of the first actuator 28 by a nut 36 and a lower end including an integral bend 38 projecting toward the robot arm 16. The moving member 32 is reciprocally movable in the longitudinal direction of the side vertical panel 26, i.e., in the vertical direction in FIG. 1, by the first actuator 28 while being guided by the guide member 30.

A bolt 42 threaded in the upper surface of the bend 38 by a nut 40 serves to adjust the stroke length of the laser beam applying mechanism 14. The stroke length of the laser beam applying mechanism 14 can be adjusted by increasing or decreasing the distance by which the bolt 42 is threaded in the upper surface of the bend 38. An elastic member 44 is mounted on the lower surface of the side vertical panel 26 in vertical alignment with the bolt 42. The elastic member 44 serves as a stop and a shock absorber when the bolt 42 hits the elastic member 44.

A base plate 46 is fixedly mounted on a side of the moving member 32 remote from the robot arm 16. The laser beam applying mechanism 14 for applying the first and second laser beams L1, L2 is attached to the base plate 46.

The laser beam applying mechanism 14 has a casing 48 fixed to the base plate 46. An optical fiber 52 for introducing a laser beam L from a laser oscillator 50 into the casing 48 is connected to an upper end of the casing 48. The casing 48 houses therein a collimator lens 54 and a condensing lens 56 which are disposed on the optical axis O of the laser beam L emitted from the lower end of the optical fiber 52. The collimator lens 54 is spaced upwardly from the condensing lens 56 in the direction indicated by the arrow A. A prism 58 is movably disposed between collimator lens 54 and the condensing lens 56, and is linearly movable by a linearly moving means 60 and rotatable by a rotating means 62.

Figure 2:
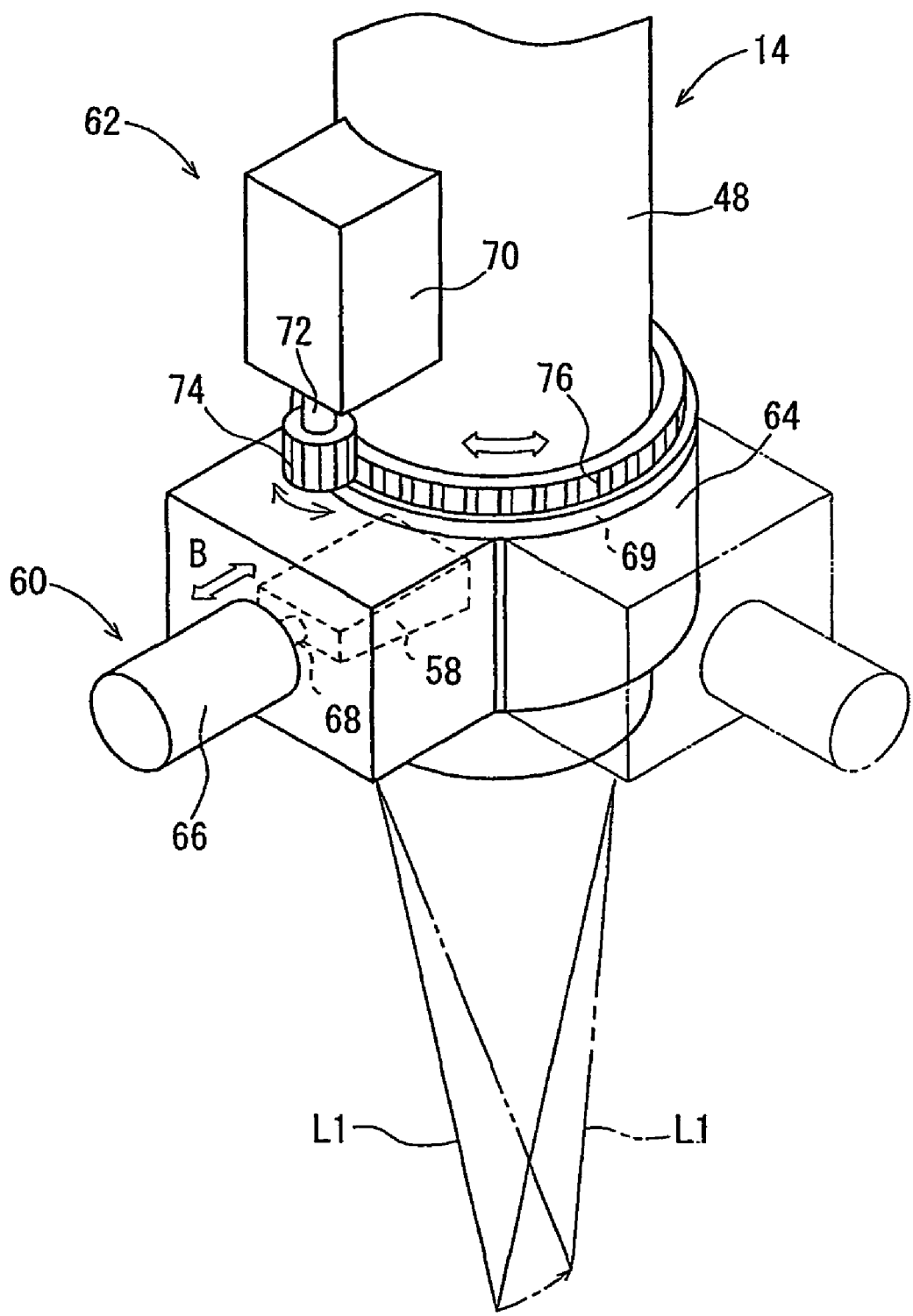
FIG. 2 is a perspective view of a linearly moving means and a rotating means of the laser beam welding apparatus.

As shown in FIGS. 1 and 2, the linearly moving means 60 comprises a second actuator 66 such as a cylinder or the like fixed to a rotating member 64. The second actuator 66 has a rod 68 projecting horizontally toward the optical axis O. The prism 58 is fixed to the tip end of the rod 68. The rotating member 64 is rotatably supported on the casing 48 by bearings 69. The prism 58 serves to divide the laser beam L into the first and second laser beams L1, L2. The linearly moving means 60 serves to adjust the output ratio of the first and second laser beams L1, L2.

The rotating means 62 comprises a third actuator 70 such as a rotary actuator or the like which has a rotatable shaft 72 with a drive gear 74 mounted thereon. The drive gear 74 is held in mesh with a ring-shaped driven gear 76 mounted on the rotating member 64. The rotating means 62 serves to adjust the position irradiated by the first laser beam L1 for thereby adjusting the relative positions (angular position) of the first and second laser beams L1, L2.

Figure 3:
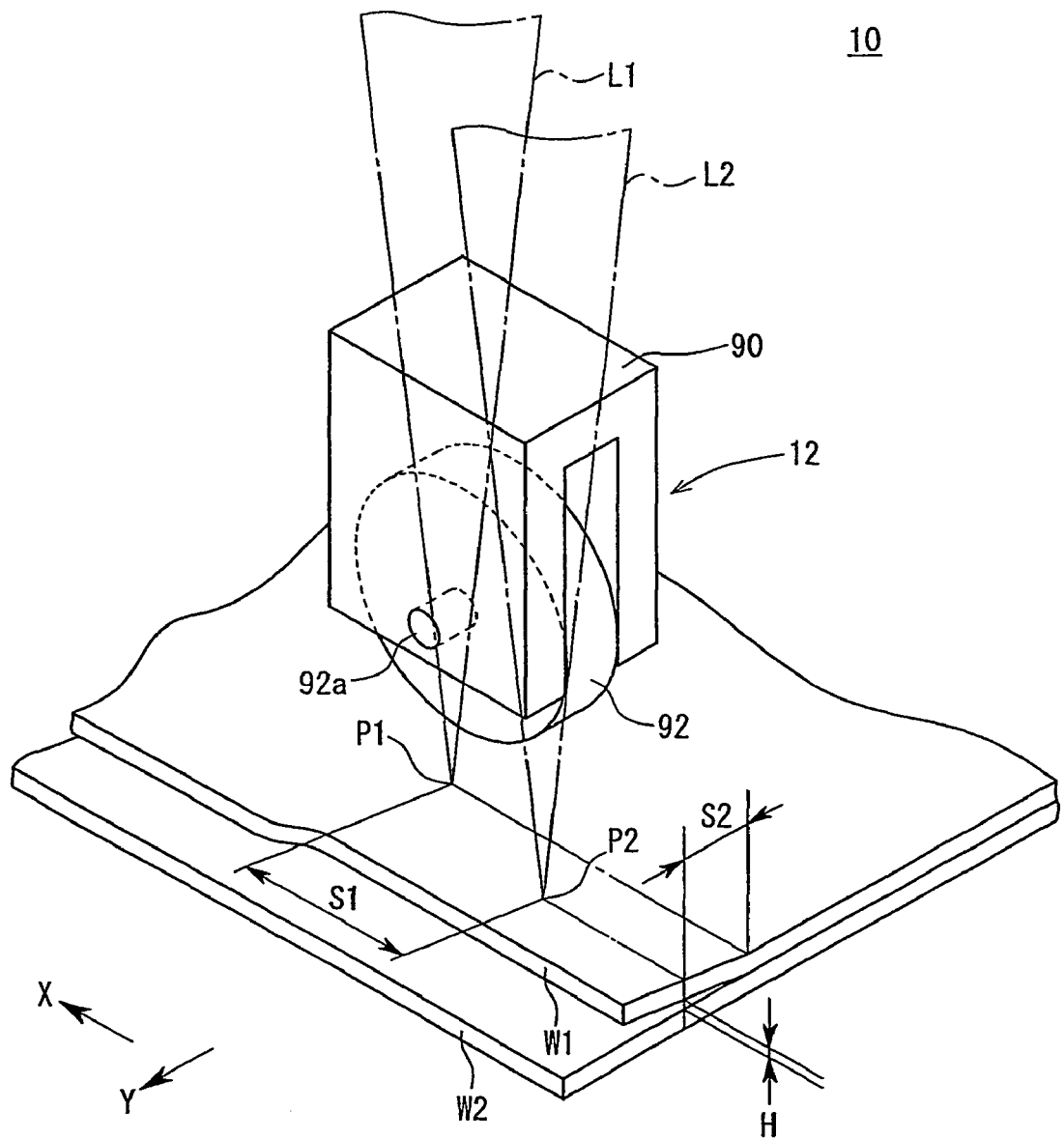
FIG. 3 is a fragmentary perspective view showing the manner in which the laser beam welding apparatus operates.

As shown in FIG. 1, the laser beam applying mechanism 14 irradiates the steel sheet W1 with the first laser beam L1 which has a smaller output and the second laser beam L2 which has an output large enough to penetrate the steel sheet W1. The first laser beam L1 serves to heat the surface of the steel sheet W1. As shown in FIG. 3, when a region of the steel sheet W1 is heated by the first laser beam L1, the heated region is plastically deformed upwardly, creating a gap H between the steel sheets W1, W2.

The second laser beam L2 is applied to the welding region P2 of the heated steel sheet W1 to keep the gap H formed between the steel sheets W1, W2 in the welding region P2 and also to weld the steel sheets W1, W2 to each other. When the steel sheets W1, W2 are welded to each other, a zinc plating gas vaporized from the steel sheets W1, W2 is discharged through the gap H into the atmosphere.

A guide member 86 has an integral plate-like holder 84 extending obliquely downwardly. One end of the guide member 86 is fixed to a lower surface 82 of the bend 38 of the moving member 32. The holding mechanism 12 for holding the steel sheets W1, W2 is supported on the other end of the guide member 86.

The holding mechanism 12 comprises a bracket 90 mounted on a base plate 88 attached to the other end of the guide member 86 and a roller 92 rotatably supported on the bracket 90 by a shaft 92a. The holding mechanism 12 may employ a holding jig, rather than the roller 92, for holding the steel sheets W1, W2 along the welding direction.

The control mechanism 18 has an actuator controller 94 and a robot controller 96. The actuator controller 94 controls the first, second, and third actuators 28, 66, 70, and the robot controller 96 controls a robot, not shown, which has the robot arm 16. The control mechanism 18 also controls the laser oscillator 50.

Operation of the laser beam welding apparatus 10 thus constructed will be described below.

First, an amount of heat to be applied by the first laser beam L1, as a forming laser beam applied from the laser beam applying mechanism 14 to the steel sheet W1, a moving speed of the first laser beam L1, and a focused spot diameter of the first laser beam L1 are established. These conditions are selected, as shown in FIG. 3, to keep the heating region P1 of the steel sheet W1 irradiated with the first laser beam L1 in an unmelted state, and to space the welding region P2 from the heating region P1 of the steel sheet W1 by a distance of 3 mm, for example, and set the gap H between the steel sheets W1, W2 to 60 μm (i.e., an angle of 1°) when the first laser beam L1 is applied to the steel sheet W1.

Figure 4:
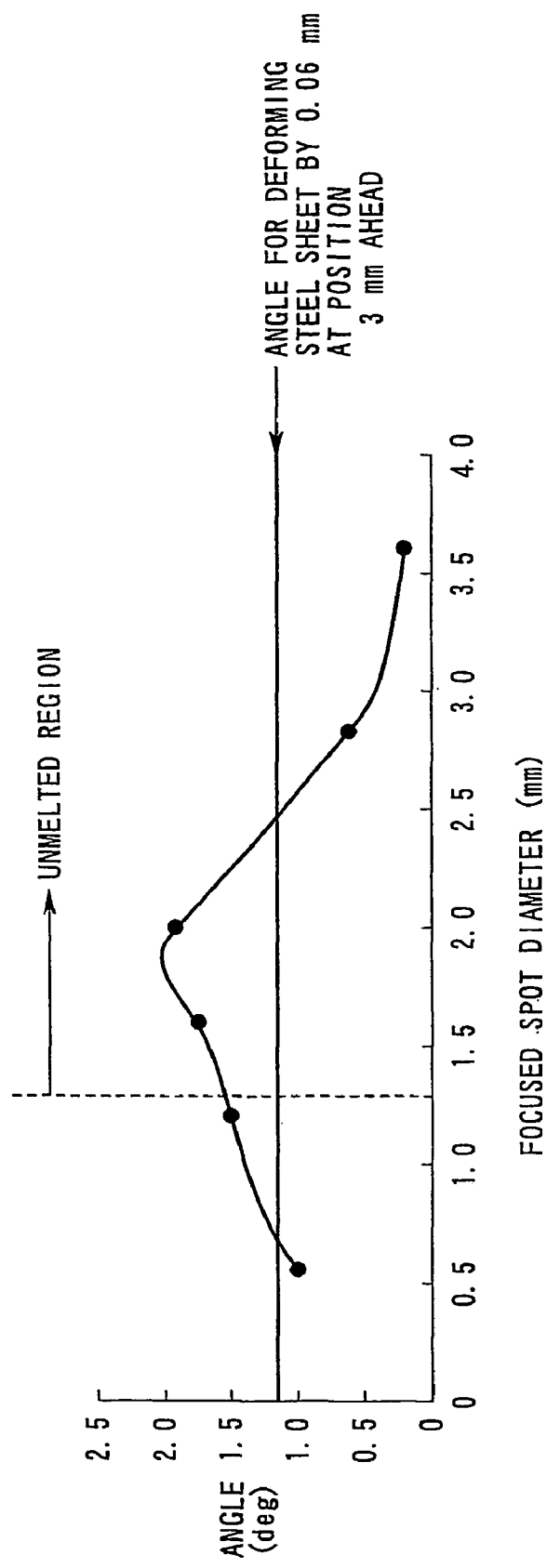
FIG. 4 is a diagram showing the relationship between focused spot diameters and angles at a laser output of 400 W and a moving speed of 5 m/min. for welding a steel sheet having a thickness of 0.7 mm.

An experiment was conducted in which the steel sheet W1 had a thickness of 0.7 mm, the first laser beam L1 had an output of 400 W, and the first laser beam L1 moved at a speed of 5 m/min., and focused spot diameters of the first laser beam L1 and angles by which the steel sheet W1 is deformed were detected. FIG. 4 shows the results of the experiment. The focused spot diameters of the first laser beam L1 for achieving the desired gap H and keeping the steel sheet W1 unmelted were 1.6 mm and 2.0 mm.

Figure 5:
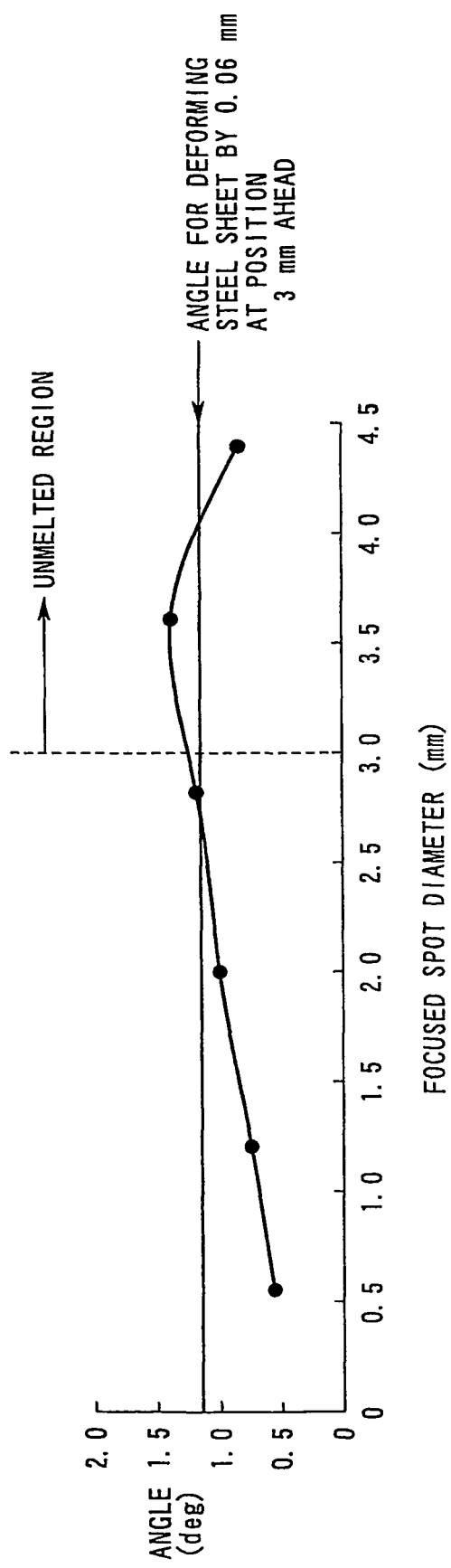
FIG. 5 is a diagram showing the relationship between focused spot diameters and angles at a laser output of 900 W and a moving speed of 2 m/min. for welding a steel sheet having a thickness of 2.0 mm.

Another experiment was conducted in which the steel sheet W1 had a thickness of 2.0 mm, the first laser beam L1 had an output of 900 W, and the first laser beam L1 moved at a speed of 2 m/min., and an optimum focused spot diameter of the first laser beam L1 was detected. FIG. 5 shows the results of the experiment. The desired gap H was achieved and the steel sheet W1 was kept unmelted when the focused spot diameter of the first laser beam L1 was 3.6 mm.

Figure 6:
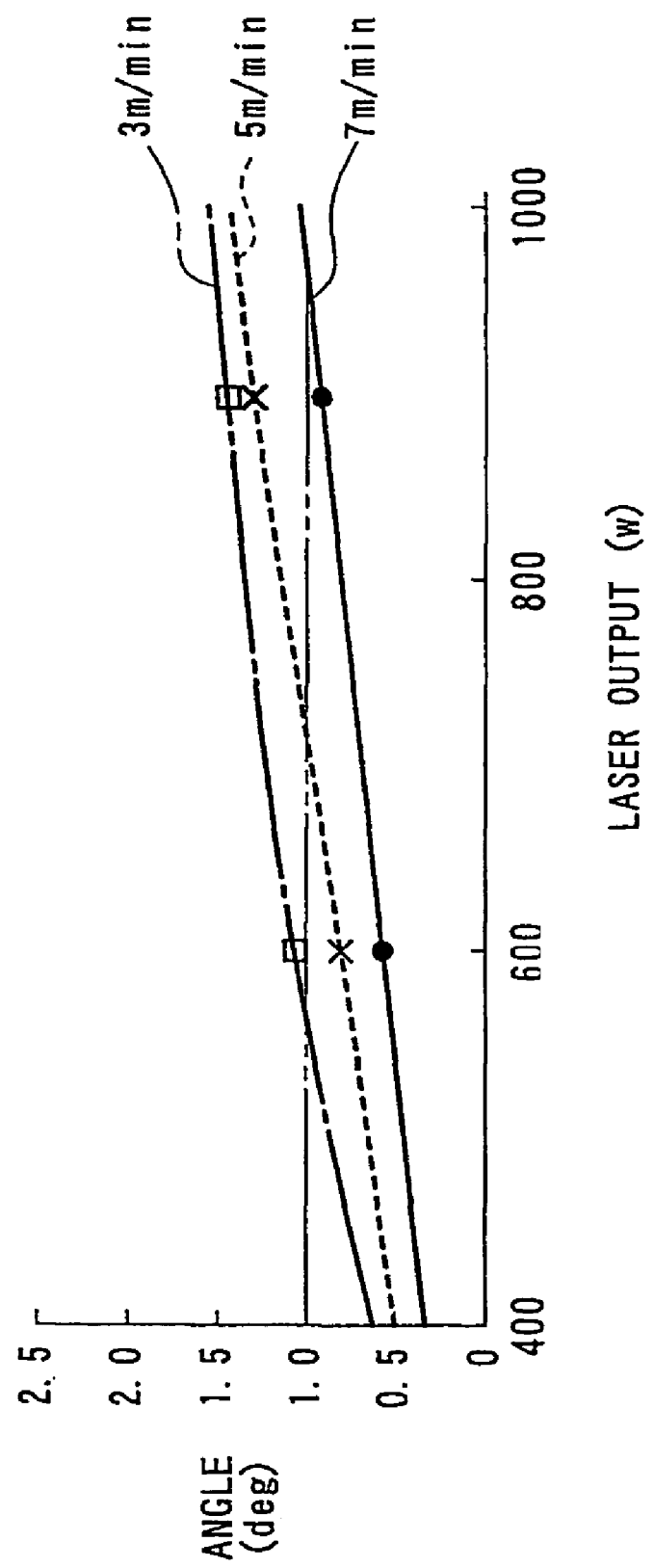
FIG. 6 is a diagram showing the relationship between laser outputs, moving speeds, and angles for welding a steel sheet having a thickness of 1.4 mm.

FIG. 6 shows angles by which the steel sheet W1 is deformed with respect to laser beam outputs and moving speeds at a focused spot diameter (with which the surface of the steel sheet W1 remains unmelted) for maximizing the deformation of the steel sheet W1 which has a thickness of 1.4 mm.

When the steel sheets W1, W2 each having a thickness of 1.4 mm are welded at a machining speed (moving speed) of 3 m/min., the steel sheets W1, W2 are reliably spaced from each other by the desired gap H (60 μm) in the welding region P2 by being irradiated with the first laser beam L1 whose focused spot diameter is about 2 mm. Therefore, the steel sheets W1, W2 can be welded to produce a high-quality joint by the second laser beam L2.

If the machining speed is to be increased, then the first laser beam L1 as the forming laser beam is required to have a higher output proportional to the machining speed. For example, if the steel sheets W1, W2 are to be welded at a machining speed of 5 m/min., for example, then the output of the first laser beam L1 may be set to about 700 W.

If each of the steel sheets W1, W2 to be welded has one side not plated with zinc, the first laser beam L1 as the forming laser beam may have a reduced output since the amount by which the steel sheet W1 is to be deformed is reduced.

The thickness of the steel sheet W1 and the output of the first laser beam L1 as the forming laser beam are proportional to each other. For example, if the thickness of the steel sheet W1 is 0.7 mm, then the amount by which the steel sheet W1 having a thickness of 1.4 mm is deformed with the laser beam output of 600 W can be achieved by applying the first laser beam L1 having an output of 300 W.

A process of welding the steel sheets W1, W2 with the laser beam welding apparatus 10 whose conditions have been determined as described above will be described below.

As shown in FIG. 1, the galvanized steel sheets W1, W2 which are of an elongate shape are held and positioned by the holding mechanism 12 while having respective portions overlapping each other. Specifically, the first actuator 28 is operated to lower the moving member 32, causing the roller 92 of the holding mechanism 12 to press the steel sheets W1, W2.

The robot arm 16 is actuated to move the holding mechanism 12 forward in the direction indicated by the arrow X in FIG. 3. At this time, the control mechanism 18 energizes the laser oscillator 50 to emit the laser beam L, which is introduced through the optical fiber 52 into the laser beam applying mechanism 14.

In the laser beam applying mechanism 14, when the laser beam L travels through the collimator lens 54 to the condensing lens 56, it is divided into the first and second laser beams L1, L2 by the prism 58 (see FIG. 1). The first laser beam L1 is applied to the heating region P1 of the upper steel sheet W1 which is held on the lower steel sheet W2 by the roller 92.

The heating region P1 of the steel sheet W1 which is irradiated by the first laser beam L1 is heated, and plastically deformed upwardly in an unmelted state along the direction of movement of the first laser beam L1, i.e., along the direction indicated by the arrow X. Therefore, the gap H is created between the steel sheets W1, W2 (see FIG. 3).

The second laser beam L2 is applied to the steel sheet W1 at a position (welding region P2) which is spaced from the heating region P1 by a distance S1 in the direction opposite to the direction indicated by the arrow X and by a distance S2 in the direction away from the roller 92, i.e., in the direction indicated by the arrow Y. Each of the distances S1, S2 is set to a value in the range from 0.5 mm to 20 mm.

The steel sheets W1, W2 are now welded to each other along the welding region P2, and a metal (zinc) plated on the steel sheets W1, W2 is vaporized into a gas which is discharged through the gap H into the atmosphere. Consequently, the steel sheets W1, W2 are reliably and firmly welded to each other.

After the steel sheets W1, W2 are welded to each other, the first actuator 28 is operated to lift the moving member 32. The steel sheets W1, W2 are released from the holding mechanism 12 and fed to a next process where they are processed into a final product.

In the first embodiment described above, the amount of heat applied by the first laser beam L1, the moving speed thereof, and the focused spot diameter are selected to keep the steel sheet W1 irradiated by the first laser beam in the unmelted state for forming the steel sheet W1.

Unlike the conventional welding process in which the heating region P1 of the steel sheet W1 is melted, the steel sheet W1 is not deformed differently depending on how it is melted, but is formed or deformed through a desired angle at all times to keep the desired gap H between the steel sheets W1, W2. The steel sheet W1 is free of shortcomings such as undesired stresses which would be imposed if it were melted.

The laser beam welding apparatus 10 is capable of easily welding the steel sheet W1 which has different thicknesses. The zinc gas vaporized when the steel sheets W1, W2 are welded is reliably discharged through the gap H into the atmosphere, allowing the steel sheets W1, W2 to be welded preferably and firmly to each other. The laser beam welding apparatus 10 is thus capable of performing a high-quality laser beam welding process simply and reliably for effectively increased productivity.

In the first embodiment, the first laser beam L1 of a smaller output is moved in the direction indicated by the arrow X while being applied to the heating region P1 of the upper steel sheet W1, and plastically deforms the heating region P1 of the upper steel sheet W1 to create the gap H between the steel sheets W1, W2. The second laser beam L2 is applied to the welding region P2 which is spaced a given distance from the first laser beam L1, and is moved in the direction indicated by the arrow X in synchronism with the first laser beam L1 for thereby welding the steel sheets W1, W2 to each other along the heating region P2.

As described above, the first and second laser beams L1, L2 are emitted from the laser beam applying mechanism 14, and the laser beam applying mechanism 14 is moved in the direction indicated by the arrow X by the robot arm 16 to move the first and second laser beams L1, L2 in the direction indicated by the arrow X in synchronism with each other. Therefore, when the laser beam applying mechanism 14 is moved one time in the direction indicated by the arrow X, the gap H is created between the steel sheets W1, W2, and the zinc gas is discharged through the gap H, allowing the steel sheets W1, W2 to be reliably welded to each other.

The laser beam welding apparatus 10 can thus perform a laser beam welding process in a single movement unlike the conventional laser beam welding process in which the steel sheets W1, W2 are irradiated individually with the first laser beam L1 and then the second laser beam L2. In the first embodiment, therefore, the steel sheets W1, W2 can be welded simply and quickly for effectively increased productivity.

As shown in FIG. 3, the second laser beam L2 is spaced from the first laser beam L1 by the distance S1 downstream in the welding direction (opposite to the direction indicated by the arrow X) and by the distance S2 in the direction away from the holding mechanism 12, i.e., in the direction indicated by the arrow Y. Each of the distances S1, S2 is set to a value in the range from 0.5 mm to 20 mm. While the gap H is being accurately maintained between the steel sheets W1, W2, the steel sheets W1, W2 are welded to each other, and the zinc gas from the steel sheets W1, W2 is reliably discharged, allowing the steel sheets W1, W2 to be welded preferably and firmly to each other.

The holding mechanism 12 has the roller 92 for pressing the steel sheet W1 against the steel sheet W2. The steel sheets W1, W2 may be flat sheets or various other formed sheets such as pressed sheets as they can securely be held in position by the holding mechanism 12. The laser beam welding apparatus 10 has a wide range of applications as it is not required to hold ends of such formed sheets.

The roller 92 of the holding mechanism 12 rotates while pressing the steel sheet W1. The holding mechanism 12 is capable of reliably positioning and holding the steel sheets W1, W2 with a simple arrangement. When the steel sheets W1, W2 are welded to each other, the roller 92 is subject to the heat produced by the welding of the steel sheets W1, W2. Therefore, the roller 92 should preferably be cooled by a cooling mechanism constantly, not shown.

In the first embodiment, the output ratio of the first and second laser beams L1, L2, i.e., the amounts of heat applied thereby, can be controlled by the control mechanism 18, and the relative positions of the first and second laser beams L1, L2 can easily be changed.

Specifically, the second actuator 66 of the linearly moving means 60 is operated to positionally adjust the prism 58 in the direction indicated by the arrow B in FIG. 1 for thereby changing output ratio of the first and second laser beams L1, L2 divided from the laser beam L to easily adjust the amounts of heat applied by the first and second laser beams L1, L2.

When the third actuator 70 of the rotating means 62 is operated to rotate the drive gear 74, the driven gear 76 meshing with the drive gear 74 is rotated, causing the rotating member 64 to adjust the angular position of the prism 58 (see FIG. 2). Therefore, the relative positions of the first and second laser beams L1, L2 are changed to apply the first and second laser beams L1, L2 to respective desired positions.

Figure 7:
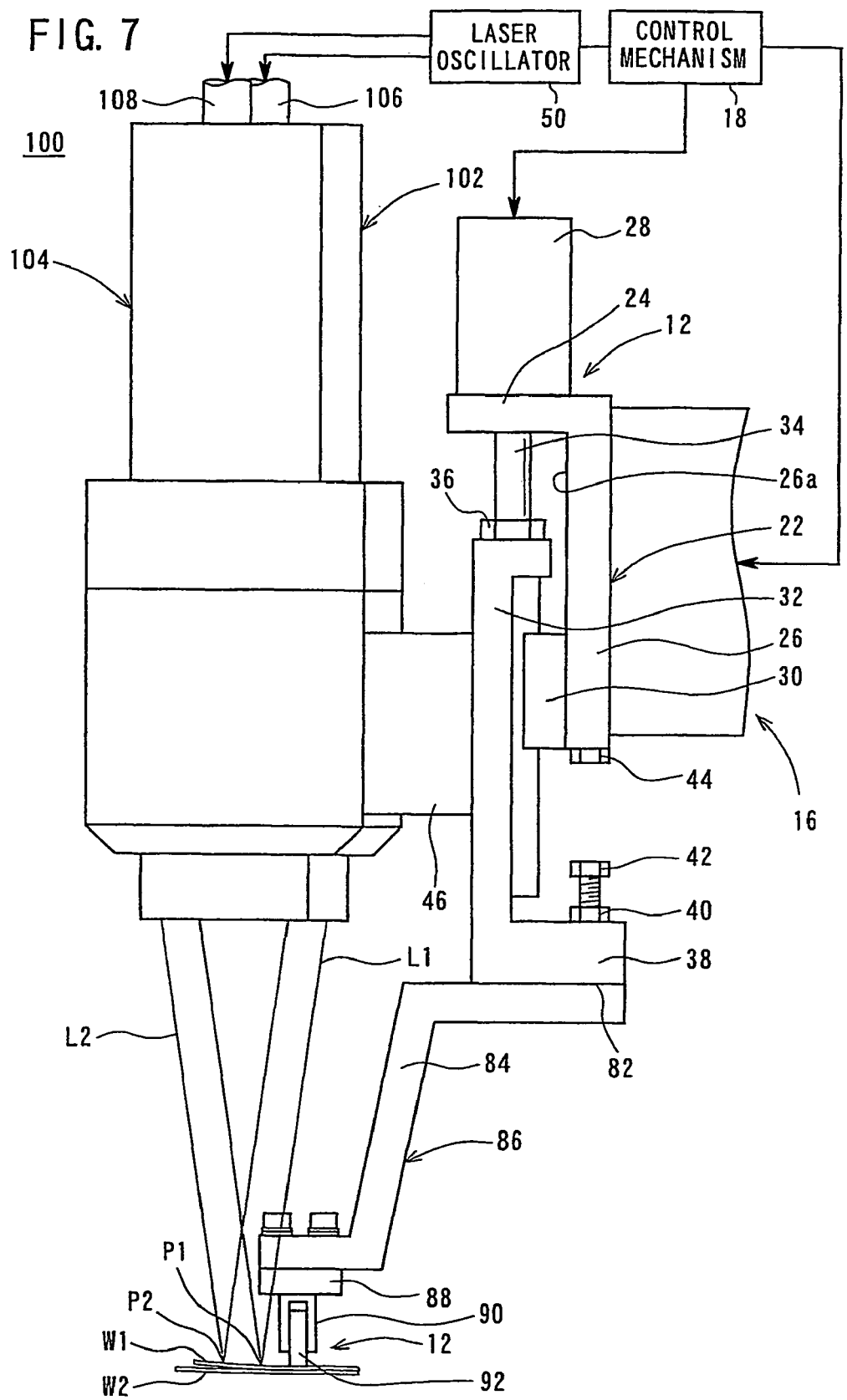
FIG. 7 is a side elevational view, partly in block form, of a laser beam welding apparatus according to a second embodiment of the present invention.

FIG. 7 shows in side elevation, partly in block form, a laser beam welding apparatus 100 of a second embodiment according to the present invention. Those parts of the laser beam welding apparatus 100 which are identical to those of the laser beam welding apparatus 10 of the first embodiment are denoted by identical reference characters, and will not be described in detail below.

The laser beam welding apparatus 100 has first and second laser beam heads (laser beam applying mechanisms) 102, 104 for independently applying the first and second laser beams L1, L2, respectively. The first and second laser beam heads 102, 104 are integrally fixed to the base plate 46.

Each of the first and second laser beam heads 102, 104 has a collimator lens and a condensing lens, not shown, housed in its casing. The first and second laser beam heads 102, 104 focus the respective first and second laser beams L1, L2 delivered through respective optical fibers 106, 108 at given focal lengths and apply the focused first and second laser beams L1, L2 to the steel sheets W1, W2. The second laser beam head 104 is disposed obliquely behind the first laser beam head 102 along the welding direction. The first and second laser beam heads 102, 104 are thus arranged in a two-beam applying configuration.

In the second embodiment, while the steel sheets W1, W2 are being held by the holding mechanism 12, the first laser beam head 102 applies the first laser beam L1 to the heating region P1 of the steel sheet W1, heating the steel sheet W1 in an unmelted state and plastically deforming the steel sheet W1 thereby to create the gap H between the steel sheets W1, W2.

The second laser beam head 104 emits and applies the second laser beam L2 to the welding region P2 of the steel sheets W1, W2. The robot arm 16 moves the first and second laser beam heads 102, 104 in unison with each other in the welding direction. A vaporized zinc gas is discharged through the gap H between the steel sheets W1, W2, which are reliably and firmly welded to each other at the welding region P2.

In the second embodiment, the laser beam welding apparatus 100 is thus capable of performing a laser beam welding process simply and quickly for effectively increased productivity, and offers the same advantages as those of the laser beam welding apparatus 10 of the first embodiment.

Figure 8:
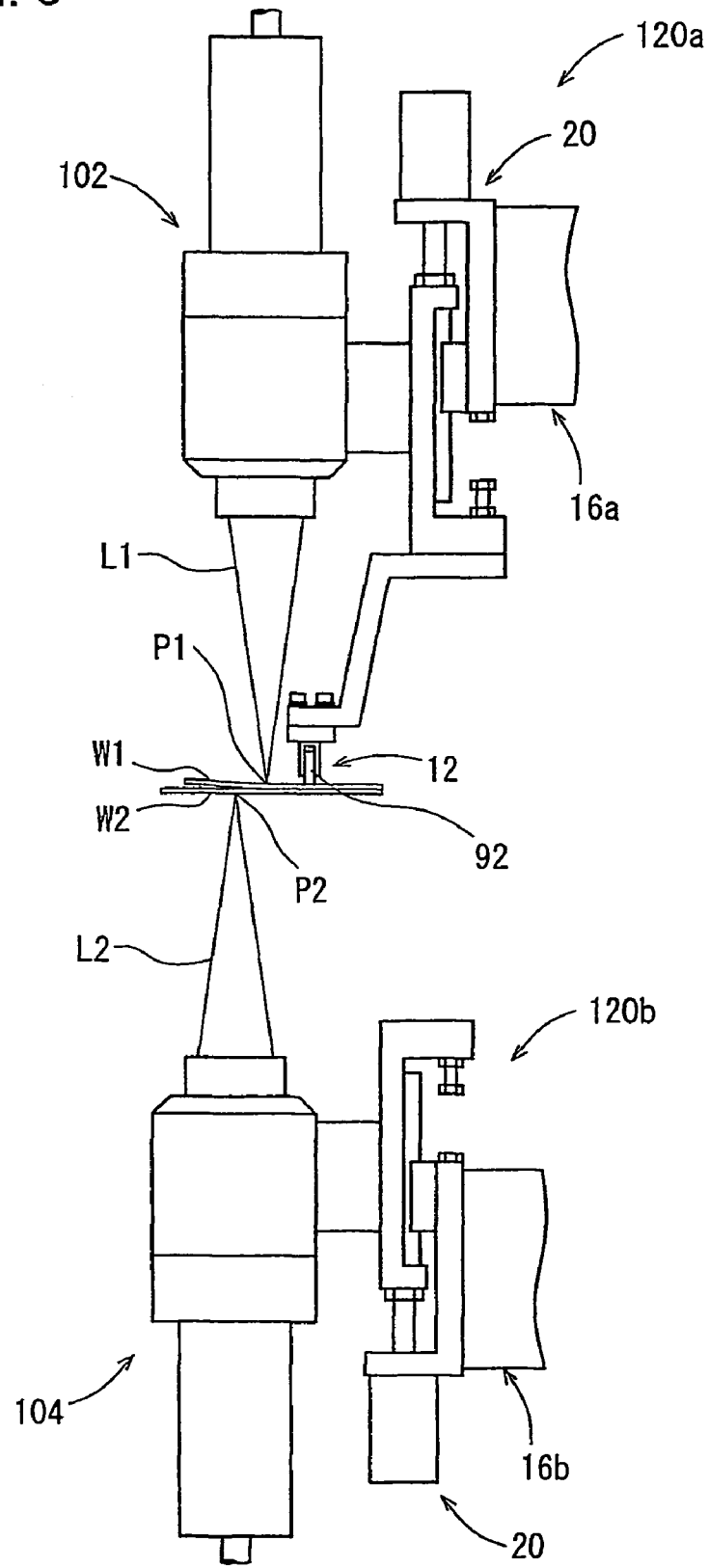
FIG. 8 is a side elevational view of laser beam welding apparatus according to a third embodiment of the present invention.

FIG. 8 shows in side elevation laser beam welding apparatus 120a, 120b of a third embodiment according to the present invention. Those parts of the laser beam welding apparatus 120a, 120b which are identical to those of the laser beam welding apparatus 100 of the second embodiment are denoted by identical reference characters, and will not be described in detail below.

The laser beam welding apparatus 120a has a first laser beam head 102 mounted on a first robot arm 16a, and the laser beam welding apparatus 120b has a second laser beam head 104 mounted on a second robot arm 16b.

The laser beam welding apparatus 120a is disposed on the side of the steel sheet W1, and applies the first laser beam L1 to the heating region P1 of the steel sheet W1 to heat the steel sheet W1 in an unmelted state. The laser beam welding apparatus 120b is disposed on the side of the steel sheet W2, and applies the second laser beam L2 to the welding region P2 from the side of the steel sheet W2 for thereby welding the steel sheets W1, W2 to each other.

In the third embodiment, therefore, when the first and second robot arms 16a, 16b are controlled to operate in synchronism with each other, the laser beam welding apparatus 120a, 120b offer the same advantages as those of the laser beam welding apparatus 10, 100 of the first and second embodiments.

Figure 9:
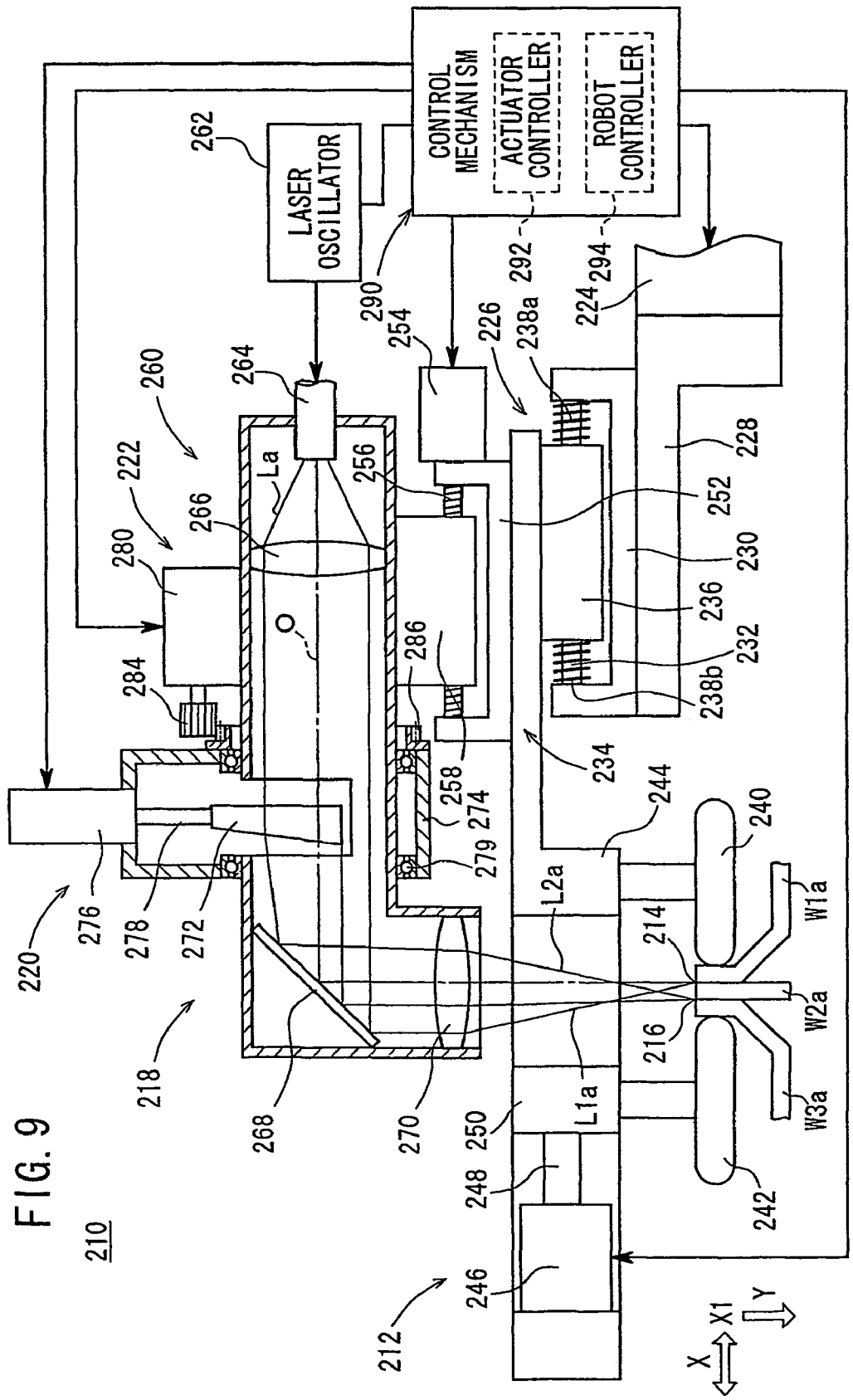
FIG. 9 is a side elevational view, partly in cross section and in block form, of a laser beam welding apparatus according to a fourth embodiment of the present invention.

FIG. 9 shows in side elevation, partly in cross section and in block form, of a laser beam welding apparatus 210 of a fourth embodiment according to the present invention.

The laser beam welding apparatus 210 comprises a holding mechanism 212 for positioning and holding a welding region of three workpieces W1a, W2a, W3a such as metal sheets, a laser beam applying mechanism 218 for substantially simultaneously applying as many first and second laser beams L1a, L2a as the number of interfaces 214, 216 provided by contacting surfaces of the workpieces W1a, W2a, W3a to the interfaces 214, 216, an amount-of-heat control mechanism 220 for controlling the amounts of heat applied by the first and second laser beams L1a, L2a depending on the material and/or thickness of the workpieces W1a, W2a, W3a, and an applied position control mechanism 222 for controlling a position where the first and second laser beams L1a, L2a are applied (hereinafter referred to as "applied position") depending on the material and/or thickness of the workpieces W1a, W2a, W3a.

The laser beam welding apparatus 210 is mounted on a robot arm 224 to which a support bracket 228 of an equalizing mechanism 226 is fixed. The support bracket 228, which is substantially of an L shape, supports a first base 230 on its upper surface. A guide rod 232 is fixed to and extends horizontally between the opposite ends of the first base 230. The guide rod 232 supports a tube 236 of a movable frame 234 thereon, and springs 238a, 238b disposed around the guide rod 232 are held against respective opposite ends of the tube 236 to keep the tube 236 in a predetermined position on the guide rod 232.

The holding mechanism 212 has a fixed roller 240 supported on the movable frame 234 and a movable roller 242 movable toward and away from the movable frame 234 in the direction indicated by the arrows X. The fixed roller 240 is rotatably mounted on an attachment 244 bent downwardly from the distal end of the movable frame 234, and engages the workpiece W1a which may be an automobile body outer panel.

The movable roller 242 is fixed by an attachment 250 to a rod 248 extending from a first actuator 246 such as a cylinder or the like in the direction indicated by the arrows X. The first actuator 246 is mounted on the movable frame 234. The movable roller 242 is rotatably mounted on the attachment 250 and engages the workpiece W3a in confronting relation to the fixed roller 240.

A second base 252 is fixedly mounted on the movable frame 234. The applied position control mechanism 222 comprises a second actuator 254 such as a motor or the like mounted on an end of the second base 252. The second actuator 254 has a drive shaft coaxially connected to a ball screw 256 rotatably supported on the second base 252 and threaded through a moving member 258. The laser beam applying mechanism 218 has a casing 260 fixedly mounted on the moving member 258.

An optical fiber 264 for introducing a laser beam La from a laser oscillator 262 into the casing 260 is connected to an end of the casing 260. The casing 260 houses therein a collimator lens 266, a bending mirror 268, and a condensing lens 270 which are disposed on the optical axis O of the laser beam La emitted from the end of the optical fiber 264. A prism 272 is movably disposed between collimator lens 266 and the bending mirror 268, and is linearly movable and angularly movable by the amount-of-heat control mechanism 220 and the applied position control mechanism 222.

Figure 10:
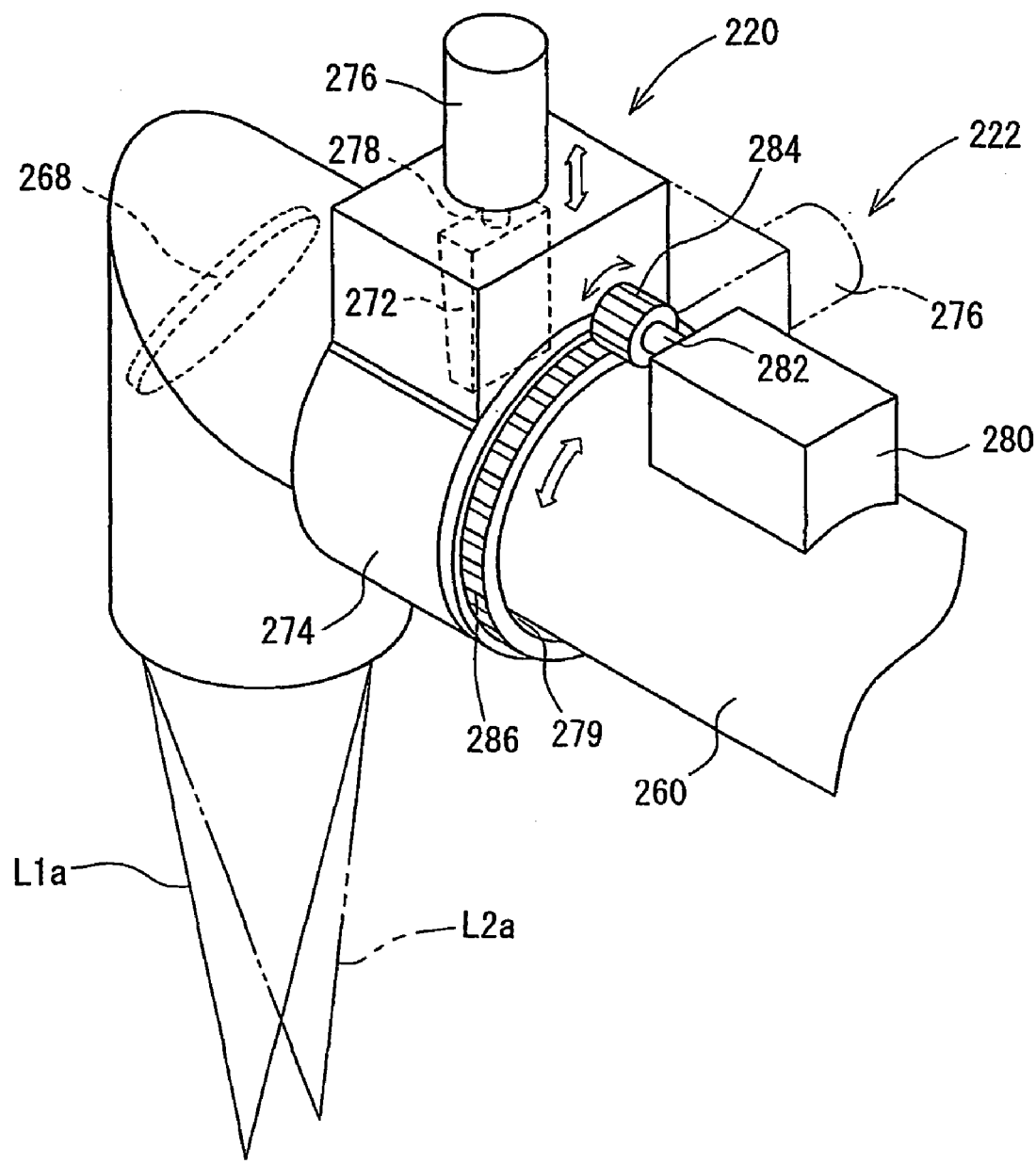
FIG. 10 is a perspective view of a linearly moving means and a rotating means of the laser beam welding apparatus according to the fourth embodiment.

As shown in FIGS. 9 and 10, the amount-of-heat control mechanism 220 has a third actuator 276 fixed to a rotating member 274. The prism 272 is fixed to the distal end of a rod 278 which projects from the third actuator 276 toward the optical axis O. The rotating member 274 is rotatably supported on the casing 260 by bearings 279. The prism 272 serves to divide the laser beam L into first and second laser beams L1a, L2a. The amount-of-heat control mechanism 220 serves to adjust the output ratio of the first and second laser beams L1a, L2a.

The applied position control mechanism 222 has a fourth actuator 280 such as a motor or the like which has a rotatable shaft 282 with a drive gear 284 mounted thereon. The drive gear 284 is held in mesh with a ring-shaped driven gear 286 mounted on the rotating member 274. The applied position control mechanism 222 serves to adjust the relative positions (angular positions) of the first and second laser beams L1a, L2a with the fourth actuator 280, and also to adapt to changes in the thickness of the workpiece W1a with the second actuator 254.

As shown in FIG. 9, the laser beam welding apparatus 210 is controlled by a control mechanism 290 having an actuator controller 292 and a robot controller 294. The actuator controller 292 controls the first, second, third, and fourth actuators 246, 254, 276, 280, and the robot controller 294 controls a robot, not shown, which has the robot arm 224. The control mechanism 290 also controls the laser oscillator 262.

Operation of the laser beam welding apparatus 210 thus constructed will be described below.

First, the workpieces W1a, W2a, W3a are held and positioned by the holding mechanism 212 while having respective portions overlapping each other. Specifically, the robot controller 294 moves the robot arm 224, causing the fixed roller 240 of the holding mechanism 212 into abutment against the workpiece W1a.

Then, the first actuator 246 is operated to move the rod 248 in the direction indicated by the arrows X. The movable roller 242 moves in the direction indicated by the arrow X1 in unison with the attachment 250 fixed to the rod 248, into engagement with the workpiece W3a. The overlapping ends of the workpieces W1a, W2a, W3a are now positioned and held by the fixed roller 240 and the movable roller 242.

The control mechanism 290 energizes the laser oscillator 262 to emit the laser beam La, which is introduced through the optical fiber 264 into the laser beam applying mechanism 218.

In the laser beam applying mechanism 218, when the laser beam La travels through the collimator lens 266 to the condensing lens 268, it is divided into the first and second laser beams L1a, L2a by the prism 272.

The first and second laser beams L1a, L2a are reflected and bent downwardly about 90° by the bending mirror 268. Then, the first and second laser beams L1a, L2a are applied through the condensing lens 270 to the overlapping ends of the workpieces W1a, W2a, W3a. The first laser beam L1a serves as a core beam, and is applied to the interface 214 between the workpieces W1a, W2a to weld the interface 214. The second laser beam L2a serves as a rotary beam, and is applied to the interface 216 between the workpieces W2a, W3a to weld the interface 216.

Then, the robot arm 224 is moved in the welding direction on the workpieces W1a, W2a, W3a. While the fixed roller 240 and the movable roller 242 are positioning and holding the overlapping ends of the workpieces W1a, W2a, W3a, the laser beam applying mechanism 218 applies the first and second laser beams L1a, L2a to the interfaces 214, 216 to weld the interfaces 214, 216.

In the fourth embodiment, the two interfaces 214, 216 are present in the overlapping ends of the workpieces W1a, W2a, W3a, and as many first and second laser beams L1a, L2a as the number of the interfaces 214, 216 are substantially simultaneously applied to the interfaces 214, 216 to weld the workpieces W1a, W2a, W3a together.

Consequently, when the laser oscillator 262 emits the laser beam La, the emitted laser beam La is divided into the first and second laser beams L1a, L2a to simultaneously melt the interfaces 214, 216 between the workpieces W1a, W2a, W3a which contribute to a desired strength. The workpieces W1a, W2a, W3a can thus be welded efficiently and quickly with a simpler process and arrangement than the conventional welding process in which the first and second laser beams L1a, L2a are individually applied to the interfaces 214, 216.

No laser beam is applied to the workpieces W1a, W2a, W3a in the overlapping direction, but the first and second laser beams L1a, L2a are applied to the interfaces 214, 216 between the workpieces W1a, W2a, W3a in the direction perpendicular to the overlapping direction. Therefore, since a large amount of heat, which would otherwise be required to weld overlapping thick sheets in the overlapping direction, is not required, thermal strains are prevented from being developed in the workpieces W1a, W2a, W3a.

The laser beam applying mechanism 218 is supported on the robot arm 224 by the equalizing mechanism 226. The fixed roller 240 is moved in the welding direction to follow the position of the workpiece W1a by the equalizing mechanism 226. Therefore, the position of the fixed roller 240 with respect to the interface 214 is held constant, allowing the first laser beam L1a as the core beam to be applied accurately to the interface 214 at all times to perform the welding process reliably.

In the fourth embodiment, when the thickness and material of the workpieces W1a, W2a, W3a are changed, the amount-of-heat control mechanism 220 and/or the applied position control mechanism 222 are operated to accommodate such a change. Operation of the amount-of-heat control mechanism 220 and the applied position control mechanism 222 at the time the thickness of the workpieces W1a, W2a, W3a is changed will be described below. A change in the material of the workpieces W1a, W2a, W3a can be handled by adjusting the output ratio of the first and second laser beams L1a, L2a, and will not be described in detail below.

Figure 11:
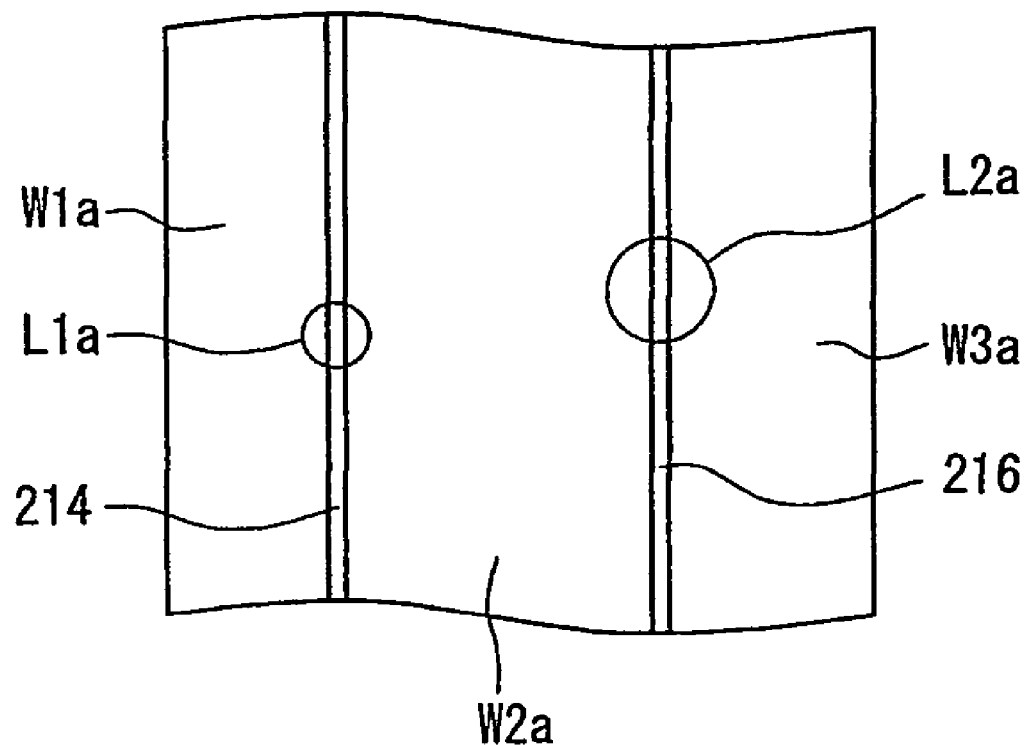
FIG. 11 is a view illustrative of a process of changing a beam ratio with the laser beam welding apparatus according to the fourth embodiment.

As shown in FIG. 11, if the workpieces W2a, W3a are thicker than the workpiece W1a, then the beam ratio of the second laser beam L2a for the thicker workpieces needs to be made higher than the beam ratio of the first laser beam L1a for the thinner workpiece.

The third actuator 276 of the amount-of-heat control mechanism 220 is operated to positionally adjust the prism 272 in the direction indicated by the arrow Y in FIG. 9. The output ratio of the first and second laser beams L1a, L2a divided from the laser beam La is changed to join the workpieces W1a, W2a, W3a easily and reliably to achieve a desired strength.

Figure 12:
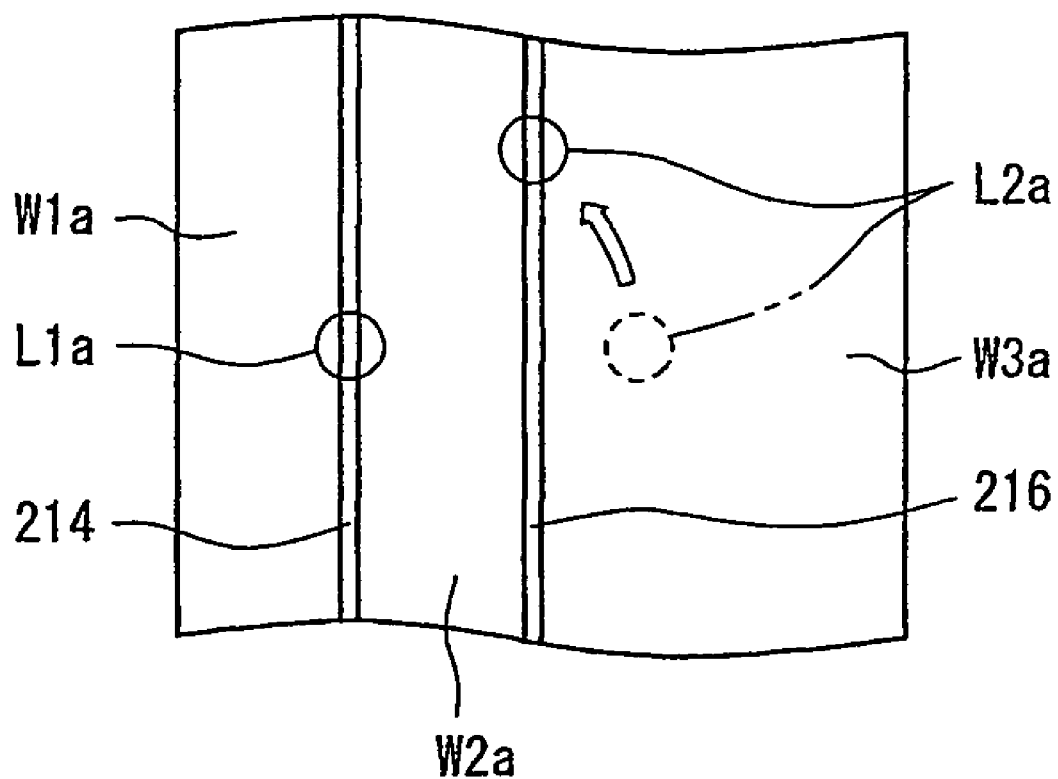
FIG. 12 is a view illustrative of a process of rotating a laser beam with the laser beam welding apparatus according to the fourth embodiment.

If the intermediate workpiece W2a is considerably thin as shown in FIG. 12, then it may be possible to reduce the distance between the first and second laser beams L1a, L2a. However, the melted regions produced by the first and second laser beams L1a, L2a may be joined to each other, possibly failing to melt the interfaces 214, 216 as desired.

According to the present invention, the fourth actuator 280 of the applied position control mechanism 222 is operated to rotate the drive gear 284 to cause the driven gear 286 meshing therewith to rotate the rotating member 274 for thereby adjusting the angular position of the prism 272 (see FIG. 10).

Therefore, as shown in FIG. 12, the second laser beam L2a is rotated in the direction indicated by the arrow around the first laser beam L1a, and is reliably applied to the interface 216. Since the second laser beam L2a is rotated while the distance between the first and second laser beams L1a, L2a is being kept constant, melted regions produced by the first and second laser beams L1a, L2a are independent of each other, allowing the interfaces 214, 216 to be melted as desired. The interfaces 214, 216 can thus firmly be welded.

When the thickness of the outer workpiece W1a is changed, the second actuator 254 of the applied position control mechanism 222 is operated to rotate the ball screw 256 to move the moving member 258 in the direction indicated by the arrow X. The distance between the fixed roller 240 and the optical axis O is adjusted to cause the first laser beam L1a to be applied accurately and reliably to the interface 214 between the workpieces W1a, W2a.

In the laser beam applying mechanism 218, the prism 272 is spaced from the optical axis O to apply the single laser beam La to the interface of two workpieces (not shown). Thus, two workpieces can smoothly be welded to each other by the single laser beam La applied to the interface of the workpieces.

In the fourth embodiment, the second actuator 254 is used to positionally adjust the first and second laser beams L1a, L2a in the direction indicated by the arrow X. However, the second actuator 254 may not be used, but the bending mirror 268 may be arranged so as to be angularly adjustable.

Figure 13:
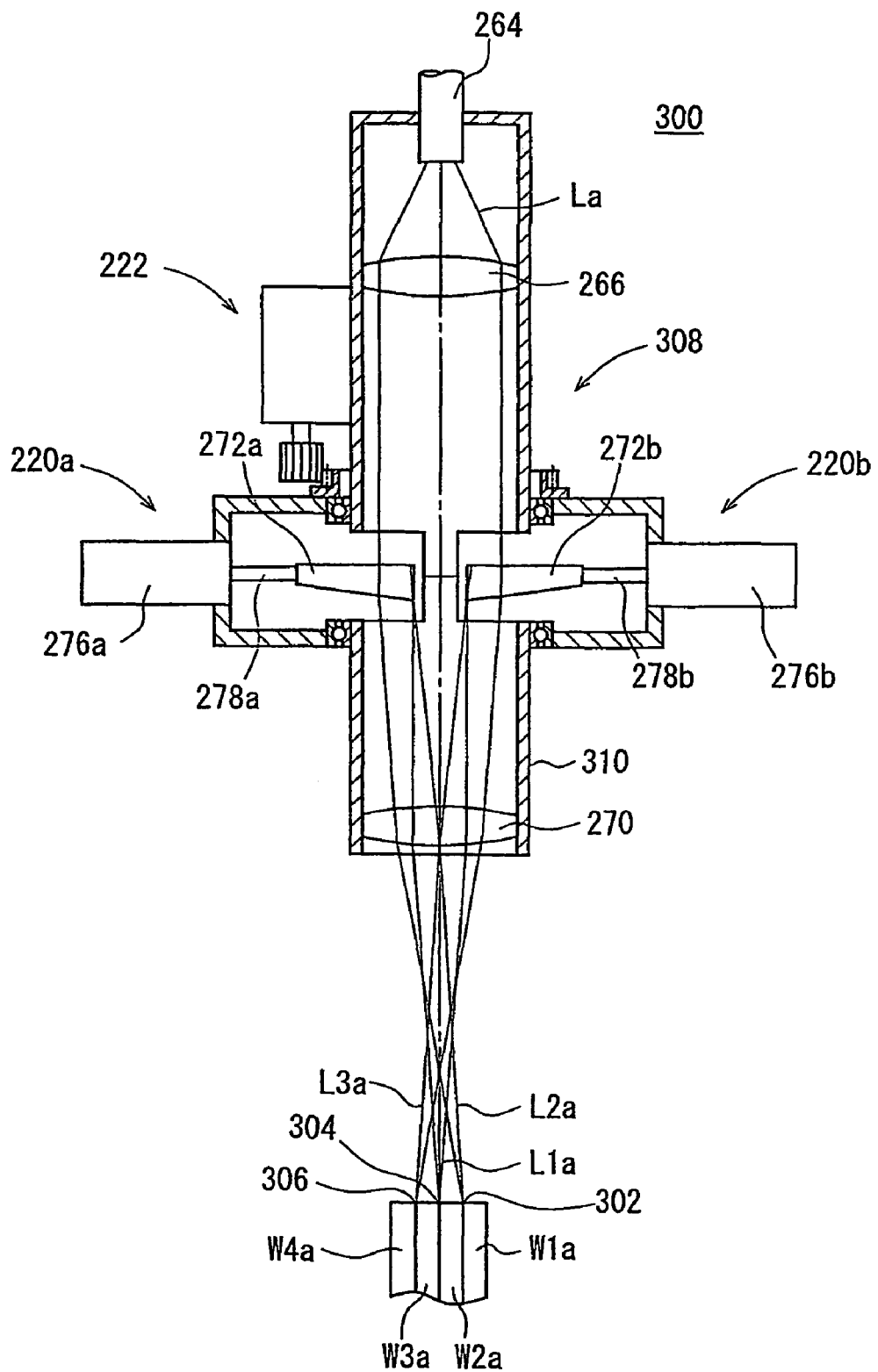
FIG. 13 is a side elevational view, partly in cross section, of a laser beam welding apparatus according to a fifth embodiment of the present invention.

FIG. 13 shows in side elevation, partly in cross section, of a laser beam welding apparatus 300 of a fifth embodiment according to the present invention. Those parts of the laser beam welding apparatus 300 which are identical to those of the laser beam welding apparatus 210 of the fourth embodiment are denoted by identical reference characters, and will not be described in detail below.

The laser beam welding apparatus 300 has a laser beam applying mechanism 308 for substantially simultaneously applying as many first through third laser beams L1a, L2a, L3a as the number of interfaces 302, 304, 306 provided by contacting surfaces of four workpieces W1a, W2a, W3a, W4a to the interfaces 302, 304, 306.

The laser beam welding apparatus 300 has a casing 310 which houses therein a pair of prisms 272a, 272b positioned between a collimator lens 266 and a condensing lens 270. The prisms 272a, 272b are movable toward and away from the optical axis O of the laser beam La by respective amount-of-heat control mechanisms 220a, 220b, and angularly movable by the applied position control mechanism 222.

The amount-of-heat control mechanisms 220a, 220b have respective third actuators 276a, 276b having respective rods 278a, 278b to which the prisms 272a, 272b are fixed, respectively. The laser beam applying mechanism 308 is of a straight-head configuration.

In the laser beam applying mechanism 308, when the laser beam La travels through the collimator lens 266 to the condensing lens 270, it is divided into the first, second, and third laser beams L1a, L2a, L3a by the prisms 272a, 272b. The first laser beam L1a serves as a core beam, and is applied to the interface 304 between the workpieces W2a, W3a. The second and third laser beams L2a, L3a serve as rotary beams, and are applied to the interface 302 between the workpieces W1a, W2a and the interface 306 between the workpieces W3a, W4a.

Because the first, second, and third laser beams L1a, L2a, L3a are substantially simultaneously applied to the three interfaces 302, 304, 306, the laser beam welding apparatus 300 is capable of welding the workpieces W1a through W4a simply and quickly, and offers the same advantages as those of the laser beam welding apparatus 210 of the fourth embodiment.

While the straight-head laser beam applying mechanism 308 is used in the fifth embodiment, the laser beam applying mechanism 308 may be arranged as a bent-head laser beam applying mechanism having the bending mirror 268 as with the laser beam applying mechanism 218 of the fourth embodiment. By contrast, the laser beam applying mechanism 218 according to the fourth embodiment may be of a straight-head type without using the bending mirror 268.

Figure 14:
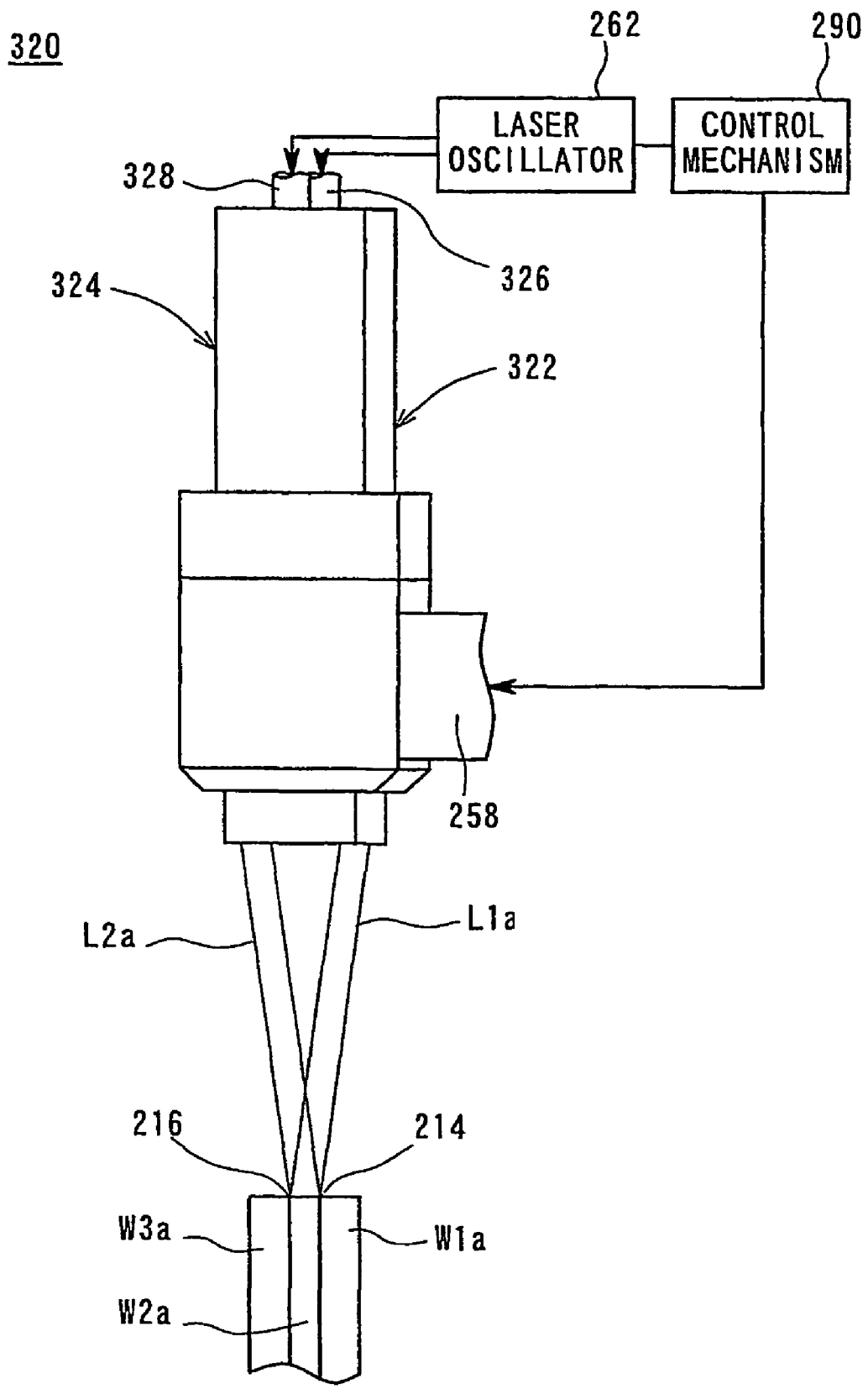
FIG. 14 is a side elevational view, partly in block form, of a laser beam welding apparatus according to a sixth embodiment of the present invention.
Figure 15:
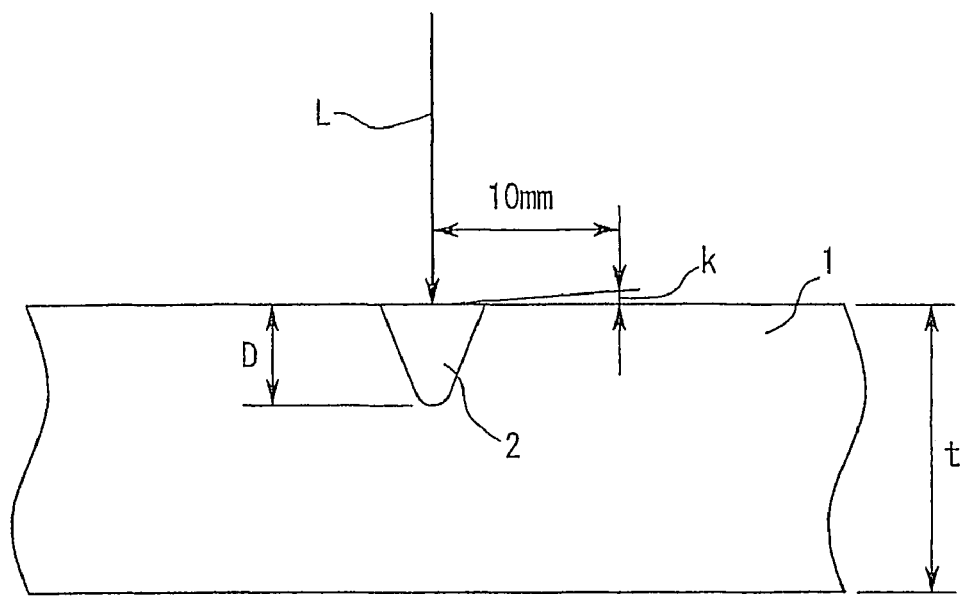
FIG. 15 is a view illustrative of a laser beam welding process according to prior art 1.
Figure 16:
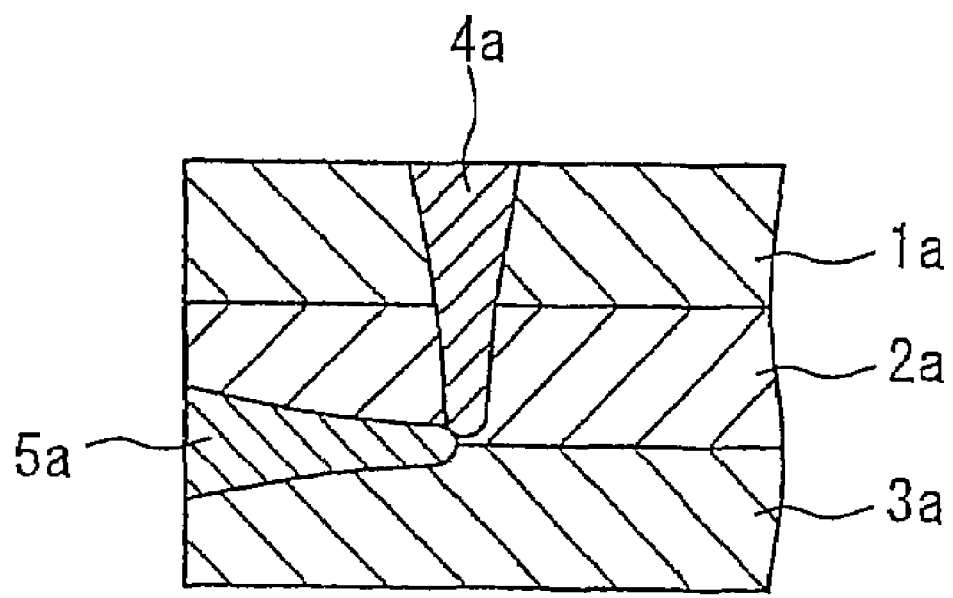
FIG. 16 is a view illustrative of a laser beam welding process according to prior art 2.
Figure 17:
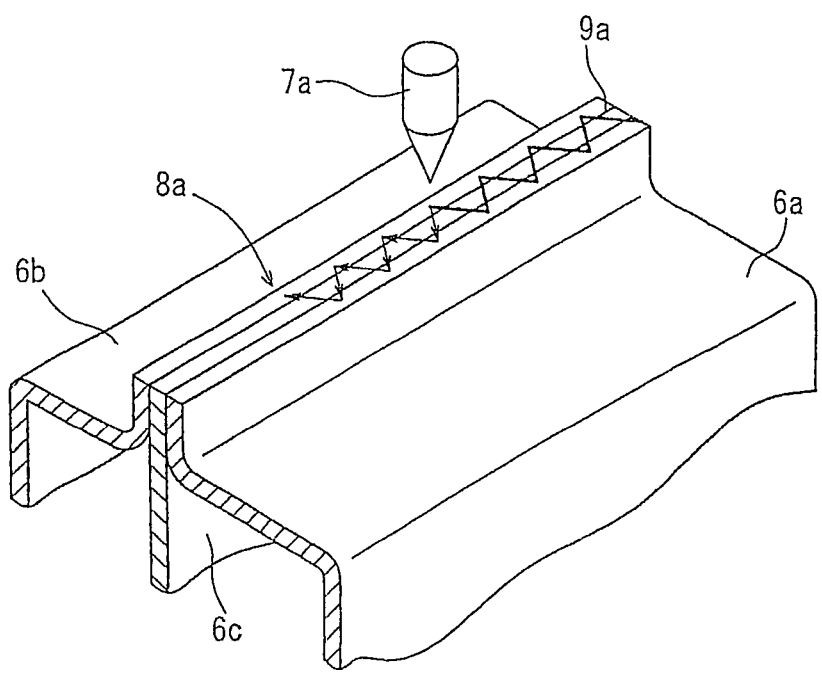
FIG. 17 is a view illustrative of a laser beam welding process according to prior art 3.

FIG. 14 shows in side elevation, partly in block form, of a laser beam welding apparatus 320 of a sixth embodiment according to the present invention. Those parts of the laser beam welding apparatus 320 which are identical to those of the laser beam welding apparatus 210 of the fourth embodiment are denoted by identical reference characters, and will not be described in detail below.

The laser beam welding apparatus 320 has first and second laser beam heads (laser beam applying mechanisms) 322, 324 for independently applying the first and second laser beams L1a, L2a, respectively. The first and second laser beam heads 322, 324 are integrally fixed to the moving member 258.

Each of the first and second laser beam heads 322, 324 has a collimator lens and a condensing lens, not shown, housed in its casing. The first and second laser beam heads 322, 324 focus the respective first and second laser beams L1a, L2a delivered through respective optical fibers 326, 328 at given focal lengths and apply the focused first and second laser beams L1a, L2a to the interfaces 214, 216 between the workpieces W1a, W2a, W3a.

The laser beam welding apparatus 320 of the sixth embodiment is capable of performing a laser beam welding process simply and quickly for effectively increased productivity, and offers the same advantages as those of the laser beam welding apparatus 210, 300 of the fourth and fifth embodiments.

INDUSTRIAL APPLICABILITY

According to the present invention, an amount of heat to be applied by the first laser beam, a moving speed of the first laser beam, and a focused spot diameter of the first laser beam are established as settings for spacing the sheets to be welded from each other by a given distance, and the sheet irradiated with the first laser beam is kept in an unmelted state. The amount by which the sheet is deformed is prevented from varying unlike the conventional process in which the sheet tends to be deformed differently when melted. The sheets to be welded can well be welded while being spaced a desired distance from each other. The deformed sheet is free of shortcomings such as undesired stresses which would be imposed if it were melted.

A metal gas, e.g., a zinc gas, vaporized when the sheets are welded is well discharged through the gap between the sheets. Therefore, the sheets can be welded accurately and efficiently by the laser beams for increased productivity without causing a welding failure.

According to the present invention, since the first laser beam for spacing the sheets a given distance from each other and the second laser beam for welding the sheets to each other are moved in the welding direction in synchronism with each other, the sheets are welded to each other in one stroke of movement of the laser beams. The laser beam welding process is thus performed simply and quickly for effectively increased productivity, unlike the conventional laser beam welding process in which laser beams are individually applied twice.

According to the present invention, furthermore, as many laser beams as the number of two or more interfaces provided by contacting surfaces of sheets to be welded are substantially simultaneously applied to the interfaces. Therefore, the two or more interfaces between the sheets which contribute to a desired strength can simultaneously be melted. The sheets can thus be welded efficiently and quickly with a simple process and arrangement, and thermal strains are prevented from being developed in the sheets.

The amounts of heat applied by two or more laser beams are changed depending on the material and/or thicknesses of the sheets. Therefore, the sheets can be melted in a balanced fashion depending on the material and/or thicknesses thereof, and can reliably be welded to each other.

The applied positions of two or more laser beams are changed depending on the material and/or thicknesses of the sheets. Consequently, the laser beam welding apparatus are capable of handling changes in the material and/or thicknesses of the sheets with ease, and of welding various different sheets reliably to each other.

Although certain preferred embodiments of the present invention have been shown and described in detail, it should be understood that various changes and modifications may be made therein without departing from the scope of the appended claims.

The invention claimed is:

1. A method of welding overlapping regions of sheets, each having a base metal covered with a layer of a metal whose melting point is lower than the melting point of the base metal, to each other by applying laser beams to the overlapping regions, comprising the steps of:

positioning a holding mechanism having a continuously moving contact portion directly above a portion of the overlapping regions of the sheets so as to make contact with a top one of the sheets, the position of the continuously moving contact portion of the holding mechanism being offset to one side of a welding region of the sheets, and being disposed at all times near a first laser beam and ahead of a second laser beam with respect to a moving direction of the holding mechanism;

positioning and holding the welding region of the sheets with the holding mechanism, and applying the first laser beam to the sheets near the contact portion of the holding mechanism to heat the sheets for thereby spacing the sheets apart from each other by a first predetermined distance (H);

applying the second laser beam to the region of the sheets where the sheets are spaced apart from each other by the first predetermined distance (H), thereby to weld the sheets to each other, the region where the second laser beam is applied being spaced apart from said first laser beam by a second predetermined distance (S2) in a direction orthogonal to the moving direction of the holding mechanism, and setting an amount of heat applied by said first laser beam, a moving speed of said first laser beam, and a focused spot diameter of said first laser beam to keep the sheet irradiated with said first laser beam in an unmelted state, wherein the contact portion of the holding mechanism and the first and second laser beams move continuously and simultaneously in the moving direction across a surface of at least one of the sheets, with the second laser beam following behind the contact portion.

2. A method according to claim 1, wherein the top one of the sheets has a lateral edge that is spaced above a surface of another one of the sheets disposed immediately below the top sheet, and is spaced apart from the continuously moving contact portion of the holding mechanism by a distance in the direction orthogonal to the moving direction of the holding mechanism that is greater than the second predetermined distance (S2).

3. A method according to claim 1, wherein said second laser beam is spaced from said first laser beam by a third predetermined distance (S1) which ranges from 0.5 mm to 20 mm at least downstream in said welding direction.

4. A method according to claim 1, wherein said holding mechanism presses the sheets near the welding region thereof for thereby positioning the welding region of the sheets.

5. A method according to claim 1, wherein the amounts of heat applied by said laser beams are changed depending on the material and/or thickness of said sheets.

6. A method according to claim 1, wherein the applied positions of said laser beams are changed depending on the material and/or thickness of said sheets.

7. A method according to claim 1, wherein said second laser beam is spaced apart from said first laser beam by a second predetermined distance (S2) which ranges from 0.5 mm to 20 mm in the direction orthogonal to said welding direction.

8. A method according to claim 1, wherein the sheets include a first sheet and a second sheet, and wherein said first laser beam is disposed on a side of the first sheet and said second laser beam is disposed on a side of the second sheet.

9. A method according to claim 1, further comprising the step of:

providing the first laser beam with a focused spot diameter in a range of 1.6 mm to 2.0 mm in order to space the sheets from each other by the first predetermined distance (H).

10. A method according to claim 1, wherein the first predetermined distance (H) is substantially equal to 60 μm.

11. An apparatus for welding overlapping regions of sheets, each having a base metal covered with a layer of a metal whose melting point is lower than the melting point of the base metal, to each other by applying laser beams to the overlapping regions, comprising:

a holding mechanism having a continuously moving contact portion for positioning and holding a welding region of the sheets, the holding mechanism being directly above a portion of the overlapping regions of the sheets so as to make contact with a top one of the sheets, the position of the continuously moving contact portion of the holding mechanism being offset to one side of a welding region of the sheets, and being disposed at all times near a first laser beam and ahead of a second laser beam with respect to a moving direction of the holding mechanism;

a laser beam applying mechanism for applying a first laser beam to the sheets near said holding mechanism to heat the sheets, and applying a second laser beam to a region of the sheets where the sheets are spaced apart from each other by a first predetermined distance (H), thereby to weld the sheets to each other, the region where the second laser beam is applied being spaced apart from said first laser beam by a second predetermined distance (S2) in a direction orthogonal to the moving direction of the holding mechanism;

a moving mechanism for moving said first and second laser beams in a welding direction in synchronism with each other; and a control mechanism for controlling the amounts of heat applied by said first and second laser beams, wherein the holding mechanism is adapted to make contact with the welding region of the sheets at the contact portion, the contact portion being disposed at all times near the first laser beam and ahead of the second laser beam with respect to the moving direction of the holding mechanism, and wherein the contact portion of the holding mechanism and the first and second laser beams are adapted to move continuously and simultaneously in the moving direction across a surface of at least one of the sheets, with the second laser beam being adapted to follow behind the contact portion.

12. An apparatus according to claim 11, wherein said second laser beam is spaced apart from said first laser beam by a third predetermined distance (S1) which ranges from 0.5 mm to 20 mm at least downstream in said welding direction.

13. An apparatus according to claim 11, wherein the top one of the sheets has a lateral edge that is spaced above a surface of another one of the sheets disposed immediately below the top sheet, and is spaced away from the continuously moving contact portion of the holding mechanism by a distance in the direction orthogonal to the moving direction of the holding mechanism that is greater than the second predetermined distance (S2).

14. An apparatus according to claim 11, wherein said laser beam applying mechanism comprises:

a prism for dividing a laser beam introduced into a casing into said first and second laser beams;

linearly moving means for moving said prism toward and away from an optical axis of said laser beam to adjust the output ratio of said first and second laser beams; and rotating means for rotating said prism with respect to said casing to adjust the relative positions of said first and second laser beams.

15. An apparatus according to claim 11, wherein said second laser beam is spaced apart from said first laser beam by a second predetermined distance (S2) which ranges from 0.5 mm to 20 mm in the direction orthogonal to said welding direction.

16. An apparatus according to claim 11, wherein the sheets include a first sheet and a second sheet, and wherein said first laser beam is disposed on a side of the first sheet and said second laser beam is disposed on a side of the second sheet.

17. An apparatus according to claim 11, wherein the apparatus according to claim 9, further comprising a robot arm for moving the contact portion continuously across the surface of the at least one of the sheets.

18. An apparatus according to claim 11, wherein the sheets include a first sheet and a second sheet, and wherein said first laser beam is disposed on a side of the first sheet and said second laser beam is disposed on a side of the second sheet.

19. An apparatus according to claim 11, wherein the apparatus according to claim 9, further comprising a robot arm for moving the continuously moving contact portion across the surface of the at least one of the sheets.

20. An apparatus according to claim 11, wherein the continuously moving contact portion is a single continuously moving contact portion.

21. An apparatus according to claim 11, wherein the second laser beam is adapted to follow behind a rearmost portion of the continuously moving contact portion.

22. An apparatus according to claim 11, the first laser beam provides a focused spot diameter in a range of 1.6 mm to 2.0 mm in order to space the sheets from each other by the first predetermined distance (H).

23. An apparatus according to claim 11, wherein the first predetermined distance (H) is substantially equal to 60 μm.

* * * * *